United States Patent [19]

Ohira et al.

[11] 3,869,720

[45] Mar. 4, 1975

[54] DICTATOR-TRANSCRIBER INDEXING SYSTEM

[75] Inventors: Tsunehisa Ohira, Sagamihara; Tohru Takahashi, Tokyo, both of Japan

[73] Assignee: Victor Company of Japan Ltd., Yokohama, Kanagawa-Ken, Japan

[22] Filed: July 25, 1973

[21] Appl. No.: 382,384

[30] Foreign Application Priority Data

July 25, 1972 Japan .......................... 47-74321

[52] U.S. Cl. .......... 360/72, 179/100.1 DR, 360/79, 360/104, 360/137

[51] Int. Cl. ..... G11b 15/18, G11b 9/02, G11b 5/48

[58] Field of Search ............ 179/100.2 S, 100.2 Z, 179/100.2 MD, 100.1 DR; 235/103; 274/4 B, 4 C, 4 E; 242/198; 360/72, 74, 79, 104, 137

[56] References Cited

UNITED STATES PATENTS

| | | | |
|---|---|---|---|
| 3,133,711 | 5/1964 | Jager | 235/103 |
| 3,685,171 | 8/1972 | Kosaka | 179/100.2 Z |
| 3,694,585 | 9/1972 | Goldner | 179/100.2 Z |
| 3,698,723 | 10/1972 | Kobler et al. | 179/100.2 Z |
| 3,760,124 | 9/1973 | Gaven | 179/100.2 Z |
| 3,827,079 | 7/1974 | Bolick | 360/72 |

*Primary Examiner*—Bernard Konick
*Assistant Examiner*—Robert S. Tupper
*Attorney, Agent, or Firm*—Holman & Stern

[57] ABSTRACT

In a dictation recording and reproducing system wherein a dictator and a transcriber are used, the dictator has a message signal recording section for recording on a recording medium dictation message signals and a control signal recording section for recording control signals in relation to the dictation message signals, and the transcriber accomplishes the operation of rewinding the recording medium thus recorded by the dictator and reproducing the recorded content of recording medium and, moreover, has an indicating section having an indicating medium moving in relation to the travel of the recording medium, a control signal reproducing section for reproducing the control signals from the recording medium thus rewound, and a marking section for inscribing marks in accordance with the control signal thus reproduced by the control signal reproducing section on the moving indicating medium of the indicating section.

6 Claims, 40 Drawing Figures

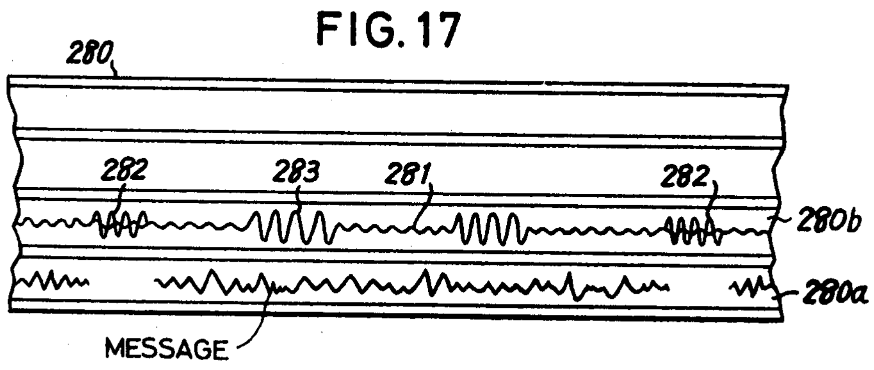
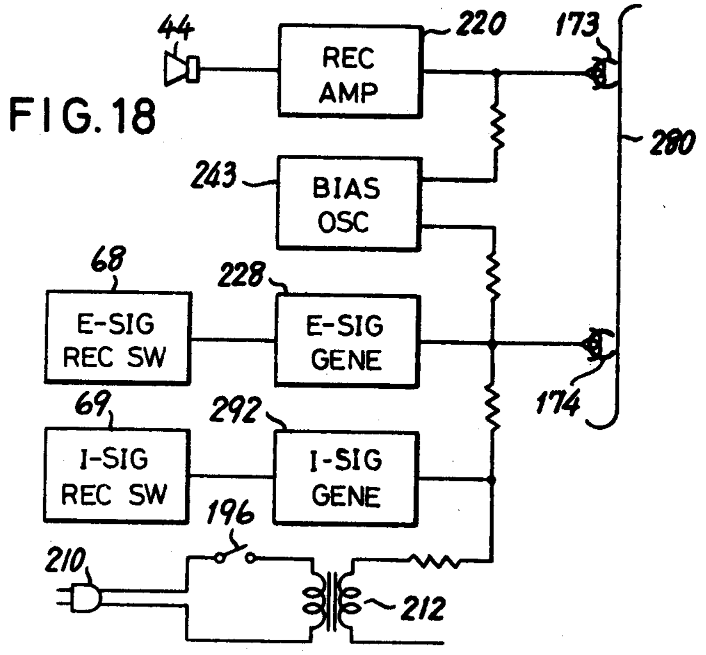
FIG. 19
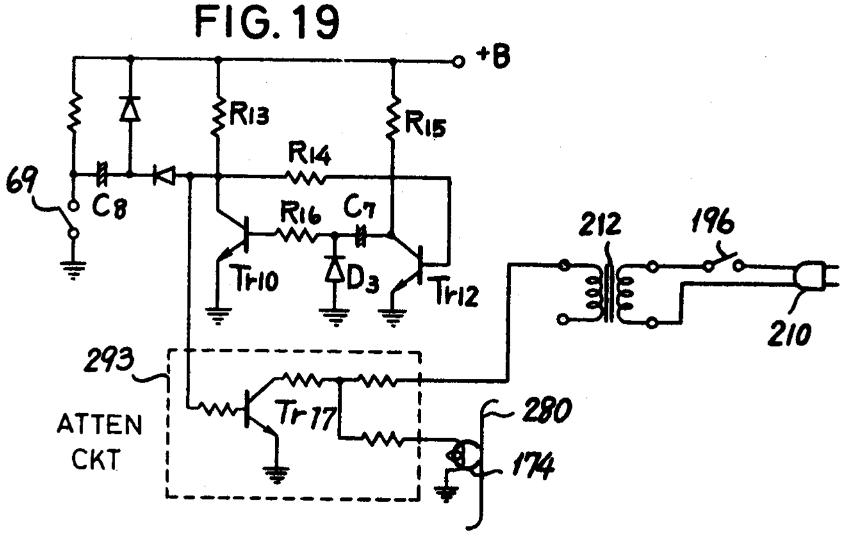

DICTATOR-TRANSCRIBER INDEXING SYSTEM

BACKGROUND OF THE INVENTION

This invention relates generally to a dictation recording and reproducing system, particularly to an oral statement or dictation recording and reproducing system of the type wherein a dictator and a transcriber are used. More specifically, the invention relates to a dictation recording and reproducing system wherein a dictation message signal and a control signal related thereto are recorded on a recording medium by a recorder (dictator or dictating machine), and by means of a reproducer (trancriber or transcribing machine), the recording medium thus recorded is rewound at high speed, during which rewinding, marks are impressed on an indicating medium moving in relation to the travel of the recording medium by a marking device operating in accordance with the reproduction of the control signal from the recording medium.

In a known dictation recording and reproducing system comprising a dictator and a transcriber, an audio signal from a microphone is recorded by a magnetic recording head on a magnetic tape in loaded state within in the dictator. At the time of starting or/and completion of recording, the recording person manipulates a switch for marking to cause specific signals be generated to activate of marking device moving in relation to the movement of the magnetic tape, and thereby to impress marks on an indication medium such as a pressure-sensitive paper or a heat-sensitive paper separate from the magnetic tape.

Next, the recorded magnetic tape and the marked indicating medium thus processed are unloaded from the dictator and loaded into the transcriber, and the tape is caused to travel. At the same time, an indicator is moved along the marked indicating medium in relation thereto thereby to cause the magnetic tape to travel as the recorded portion and the yet unrecorded portion of the tape are visually verified, and the recorded content of the tape is reproduced by a reproducing head.

In the case where a magnetic tape is recorded by utilizing a dictator in which a marking device is not used, and then the tape content is reproduced in a transcriber in accordance with this system, there is no way to distinguish the recorded portion on the magnetic tape since there is no marked indication medium. Obviously, this deficiency is inconvenient. Furthermore, when the magnetic tape is to be transferred from the dictator to the transcriber, it is necessary to handle the magnetic tape and the indication medium as one pair. If the indication medium should be lost, the operator wishing to reproduce and listen to the recording would lose the guide marks indicating important positions on the tape. A further difficulty is that, in the case where, when a large number of tapes are simultaneously handled, the correspondence between the tapes and their indication mediums becomes unclear and in the case where the interchangeability between the dictator and the transcriber is insufficient, discrepancies arise at the time of reproducing or playback between the recorded portion and the indication marks of the indication medium, and the true positions on the tape heretofore could not be accurately determined under such circumstances.

A dictation recording system, in general, is used for the purpose of transcribing a written text such as a document or a letter on a machine such as a typewriter by a secretary as the content recorded in a dictator is reproduced in a transcriber. Accordingly, any indistinctness of positions or parts such as the start of recording or/and the completion of recording is extremely inconvenient and becomes a major drawback of the system.

SUMMARY OF THE INVENTION

Accordingly, it is a general object of the invention to provide a new and useful dictation recording and reproducing system and apparatus in which the above described difficulties accompanying known systems and apparatuses have been overcome.

More specifically, an object of the invention is to provide a dictation recording and reproducing system and apparatus having a dictator and a transcriber, in which dictator, on the same magnetic tape, message signals are recorded, and control signals related to the recording of the message signals are recorded together therewith, and in which transcriber, the magnetic tape thus recorded is rewound as the control signals are reproduced, and during this rewinding, indication marks are impressed in accordance with the reproduced control signals on an indication medium moving in relation to with the rewinding. In accordance with the system of the invention, it is possible to attain precise coincidence between the indication marks on the indication medium and the corresponding message signal recording positions on the magnetic tape at the time of readiness for message signal reproduction in the transcriber.

Another object of the invention object of the invention is to provide a system and apparatus as stated above wherein three control signals of respectively different frequencies, which are recorded in relation to the message signals in the dictator, and which are reproduced in the transcriber to control the operation of the transcriber, are selected, and these control signals are clearly discriminable particularly during reproduction, it being possible, moreover, to prevent crosstalk with respect to the message signals.

Still another object of the invention is to provide a system and apparatus as stated above having a dictator capable of carrying out the operations of recording or reproducing of message signals or control signals and, moreover, of erasure of either kind of signals rapidly with respect to a magnetic tape traveling at high speed in the forward or reverse direction.

A further object of the invention is to provide a system and apparatus as stated above having a dictator capable of detecting and reproducing specific signals from a magnetic tape traveling in the forward or reverse direction and immediately rendering inoperative the tape driving means thereby to stop the travel of the magnetic tape.

A still further object of the invention is to provide a system and apparatus as stated above having a dictator provided with an indicator for indicating variable quantities such as the recording time and the distance of travel of the magnetic tape, and this indicator is automatically reset when a cartridge containing the magnetic tape is removed out of the dictator.

An additional object of the invention is to provide a system and apparatus as stated above having a transcriber adapted to sound an alarm by means such as a loudspeaker upon detection of an erroneous recording control manipulation, an erroneous manipulation, or travel of the magnetic tape to the vicinity of the final end of the magnetic tape.

Further objects and features of the present invention will be apparent from the following detailed description when read in conjunction with the accompanying drawings.

BRIEF DESCRIPTION OF THE DRAWINGS

In the drawings:

FIG. 17 is a track pattern diagram indicating still another mode of recording control signals and message signals on the tape of the dictator;

FIG. 18 is a block diagram of the electrical circuit for recording control signals and message signals shown in FIG. 17;

FIG. 19 is a specific electrical circuit diagram of an essential part of the block diagram shown in FIG. 18;

DETAILED DESCRIPTION

DICTATION RECORDING AND REPRODUCING SYSTEM

Figure 1:
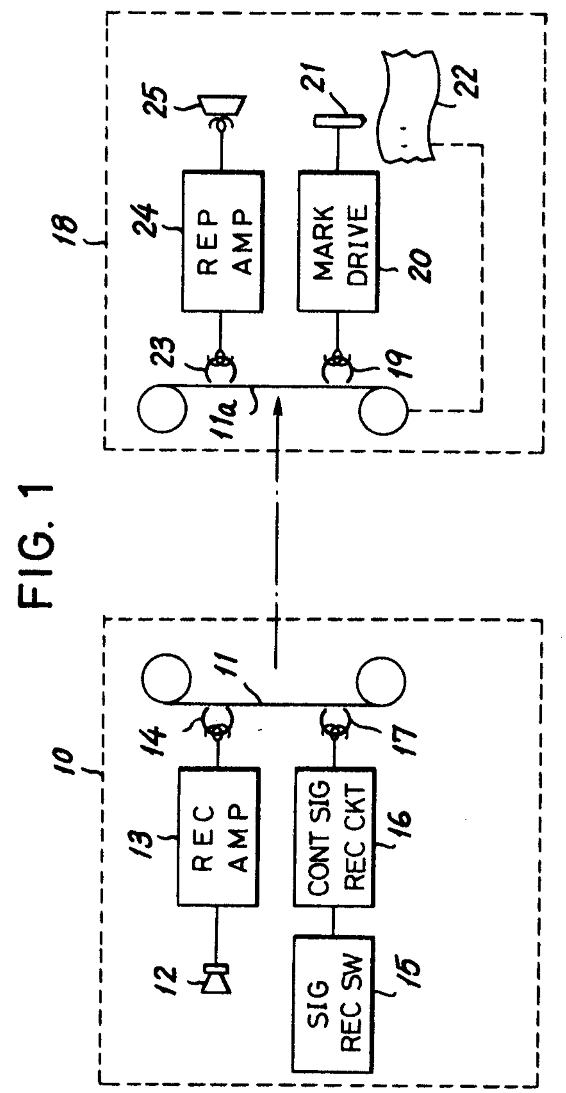
FIG. 1 is a simplified system diagram for a description of one embodiment of a dictation recording and reproducing system in which a dictator and a transcriber are used according to the present invention.

One embodiment of a dictation recording and reproducing system comprising a dictating machine (dictator) and a transcribing machine (transcriber) according to the invention is shown as a schematic system diagram is FIG. 1. The dictating machine or dictator 10 is loaded with a cassette containing a magnetic tape 11, on which and along one track thereof audio signals generated by a microphone 12 and amplified by a recording amplifier 13 is recorded by a recording head 14. At the same time, the dictating operator manipulates a signal recording switch 15 at the time of starting or/and completion of recording to cause a specific signal to be generated to activate a signal recording circuit 16, whereby a signal recording head 17 records specific control signals along another track of the magnetic tape 11.

Then the cassette containig the tape 11*a* bearing the audio signals and the control signals thus recorded thereon is extracted from the dictator 10 and loaded, as it is, into a transcriber 18. And then, high-speed rewinding of the tape 11*a* is carried out in the transcriber 18. During this operation, the control signals recorded as described above by the signal recording head 17 are detected by a signal detection head 19. The control signals thus detected are applied to a marking device driving circuit 20, whereby a marking device 21 impresses corresponding marks on an indicating medium 22 moving interrelatedly with the travel of the tape 11*a*.

Thereafter, the tape 11*a* is caused to travel at a predetermined reproducing speed as the recorded portions, unrecorded portions, and other specific instruction portions of the tape 11*a* are verified by the positions of the marks on the indicating medium 22, and the audio signals are reproduced by a reproducing head 23. After the resulting output signal has been amplified by a reproducing amplifier 24, it is reproduced as sound by a loudspeaker 25.

Figure 2:
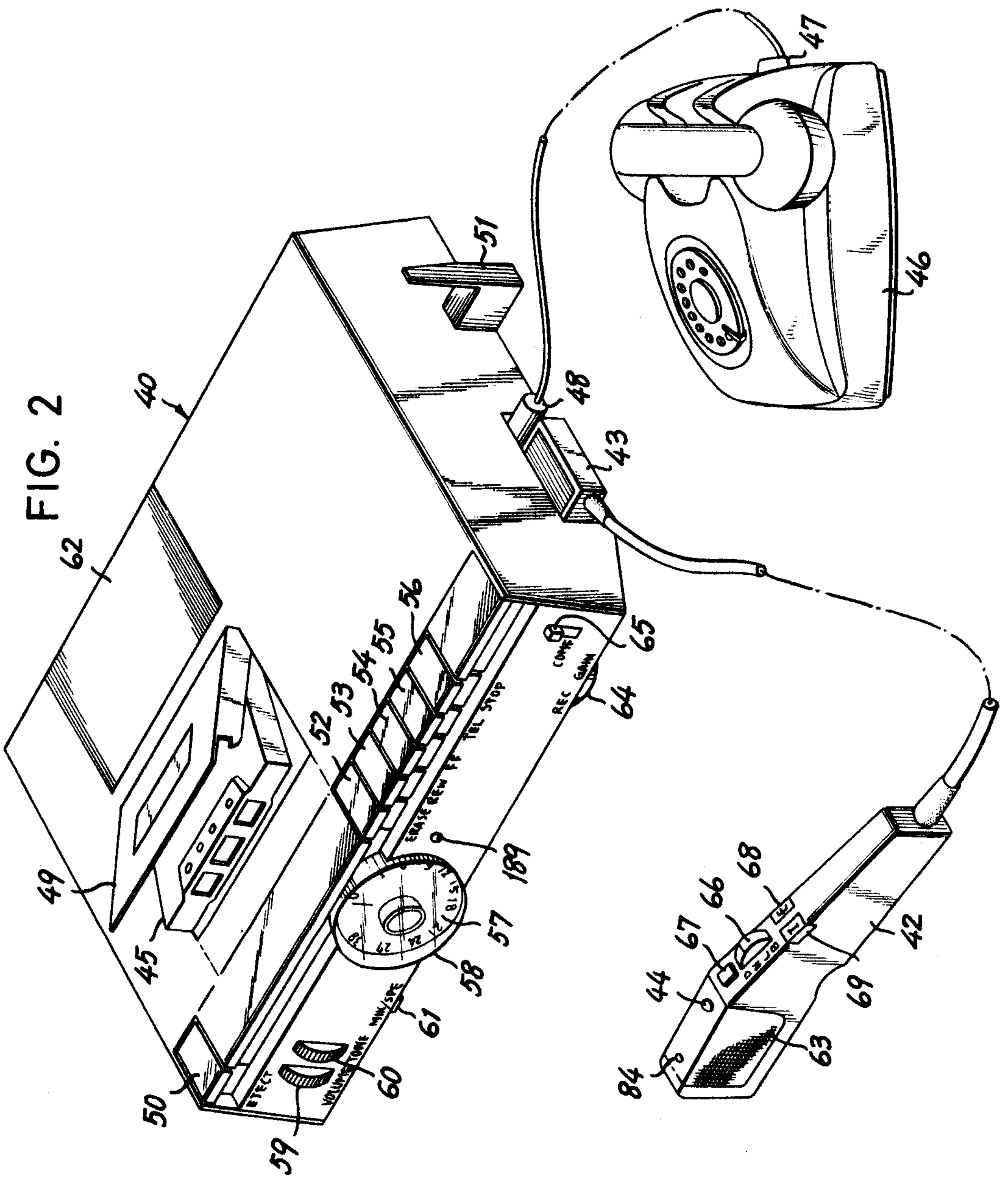
FIGS. 2 and 3 are perspective views respectively of embodiments of a dictator and a transcriber suitable for use in the dictation recording and reproducing system according to the invention.
Figure 3:
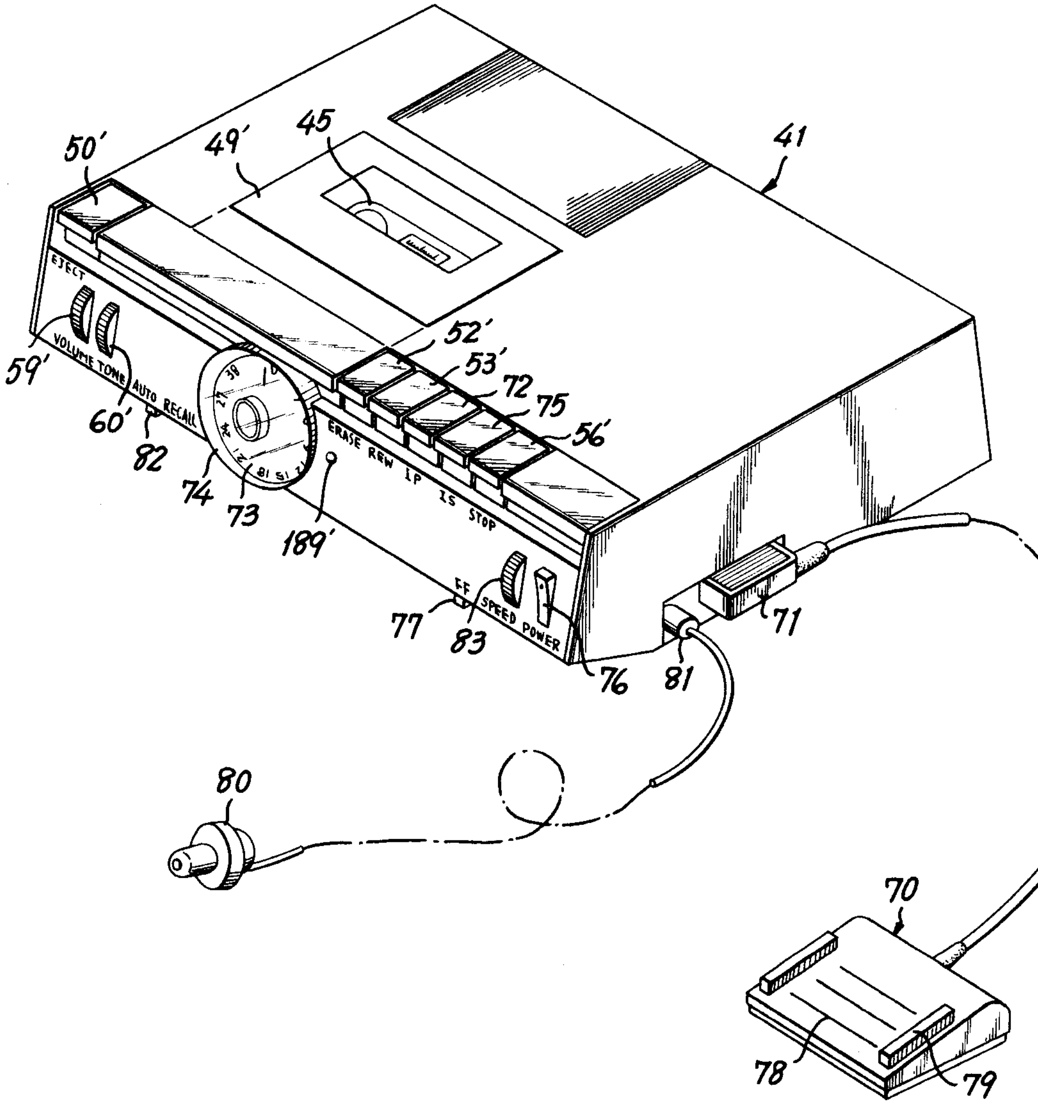

An embodiment of a dictation recording and reproducing system according to the invention comprises a dictator 40 and a transcriber 41 is illustrated in FIGS. 2 and 3. A manual control unit 42 is connected by a control plug 43 to the dictator 40 as shown in FIG. 2 and has a built-in microphone 44, by which the content of dictation is recorded on a magnetic tape provided within a cartridge 45 disposed in loaded position within the dictator 40. Furthermore, a telephone 46 is connected by way of a cord pulled out from a telephone pickup plug 47 provided on the rear side thereof and a telephone pickup plug 48 to the dictator 40, thereby making possible recordings also of telephone conversation contents.

The cartridge 45 is loaded into the dictator 40 by placing it into a specific loading position and pushing down on a cover 49 of a single-side opening construction thereby to lock the same. When a cartridge ejection key 50 is pressed, the cover 49 is unlocked and swings upright, and the cartridge 45 is pushed upward, whereby the ejection of the cartridge is facilitated. A power supply switch 51 is operated by the placement of the manual control unit 42 to open circuit a power supply circuit for the dictator 40 and by the lifting off of the manual control unit 42 to close the power supply circuit.

The dictator 40 is provided along its front part, from left to right, with an erasure key 52, a rewind key 53, a fast forward key 54, a telephone recording key 55, and a stop key 56. When the rewind key 53 or the fast forward key 54 is pushed down, the magnetic tape travels at high speed in the reverse or forward direction. By pushing down the erasure key 52 and then depressing the rewind key 53 or the fast forward key 54 to lock together the pair of keys, all tracks of the magnetic tape can be erased at high speed. When the telephone recording key 55 is depressed, it closes the power supply circuit of dictator 40 irrespective of the operational mode of the power supply switch 51, and through the telephone pickup 47, the content of conversation of the telephone 46 is recorded with maximum recording gain. When the stop key 56 is depressed, any of the keys 52 through 55 in locked state is released, and the dictator 40 is placed in an inoperative state.

A time dial 57 installed at the front of the dictator 40 is adapted to rotate counterclockwise in realtion to the forward-direction travel of the tape and to rotate clockwise in relation to the reverse-direction travel of the tape and, at the time of recording, indicates the elapsed time from the start of recording. Furthermore, the time dial 57 is adapted to return to its original angular position when the cartridge ejection key 50 is depressed. A transparent cover 58 inscribed with a datum reference line is disposed protectively on the outside of the time dial 57.

At the front of the dictator 40, there are further provided a sound volume control knob 59 and a tone quality control knob 60 respectively for adjusting the volume and tone quality of the sound reproduced from the tape. A loudspeaker changeover switch 61 is further provided at the front of the dictator to carry out connection changeover of a loudspeaker 62 installed within the dictator 40 and a loudspeaker 63 installed in the control unit 42. In addition, there are provided a recording gain control knob 64 for adjusting the recording gain during recording of audio signals from the microphone 44 and a switch 64 for conference recording, which, upon being switched to the conference recording side, results in maximum recording gain irrespective of the adjustment position of the gain control knob 64.

The manual control unit 42 is provided thereon with a four-position control switch 66, a fast-forward switch 67, an E-signal recording switch 68, and an I-signal recording switch 49, all positioned and adapted to be readily actuated by fingertip manipulation. The four-position control switch 66 can be changed over by switching to the four positions of record (D), neutral (N), reproduce (L), and rewind (BS) and is normally returned to the neutral (N) position. When this switch 66 is moved to the record (D) position, a recording indicating lamp 84 is lit only when a recordable cartridge is in loaded position within the dictator 40, thereby indicating that recording through the microphone 44 is possible. When this switch 66 is moved to the reproduce (L) position, reproduction of the content of the magnetic tape is carried out, and the reproduced sound can be listened to through the loudspeaker 62 of the dictator main unit 40 or the loudspeaker 63 installed within the control unit 42 by selectively switching the loudspeaker changeover switch 61. When this switch is moved to the rewind (BS) position, the tape within the cartridge 45 is rewound at high speed and automatically stops at a position where an E-signal is recorded as described hereinafter. The control switch 66 in the rewind (BS) position is not locked and is under a biasing force urging it to return toward the reproduce (L) position. For this reason, when the fingertip is lifted off the slide knob, this switch 66 promptly returns to the reproduce (L) position, and reproduction of the content recorded on the tape is carried out.

When the control switch 66 is placed in its neutral (N) position, and the fast-forward switch 67 is pushed, the tape is caused to travel in the forward direction at high speed and automatically stops at position of no recording of a T signal (which is a signal indicating a tape portion bearing a recorded message) as described hereinafter.

The E-signal recording switch 68 and the I-signal recording switch 69 are switched to be pressed respectively for recording on the tape an E signal (for indicating the start or/and end of a message) and an I signal (for indicating positions of information such as instructions to a secretary during tape playback) as described hereinafter. These recording switches 68 and 69 are so adapted that they can be depressed only when the control switch 66 is in the record (D) position. For this reason, E signals and I signals cannot be recorded during recording of a telephone conversation taking place through the telephone 46.

The relationships between the rewinding key 53, the fast-forward key 54, and the telephone recording key 55 provided in the dictator 40 and the four-position control switch 66 provided in the manual control unit 42 are such the operations due to the keys of the dictator 40 have priority. For example, if, when the control switch 66 is in the record (D) position, the rewinding key 53 is depressed, the tape within the cartridge will be rewound at high speed.

Next, the basic organization of the transcriber 41 will be described in conjunction with FIG. 3, in which parts having substantially the same function as those in the dictator 40 are designated by the same reference numerals respectively with the addition of prime designations. Repeated descriptions in detail of such parts will be omitted.

A cartridge 45 containing a tape recorded by the dictator 40 as described above is inserted into a prescribed loading position in the transcriber 41. The transcriber 41 is provided with a foot control unit 70 connected thereto by a plug 71 and a cord and an earphone 80 connected thereto by a plug 81 and a cord. The transcriber 41 in rendered operative by turning on a power-supply switch 76, whereupon various operations can be carried out by the following control manipulations.

When a printing key 72 is depressed, the magnetic tape is rewound at high speed. During this operation the E signal and I signal recorded at specific positions on the tape by the dictator are detected, and corresponding marks are impressed by separate heads printing on different concentric circles on a heat-sensitive printing sheet 73 rotated in relation to the travel of the magnetic tape. This heat-sensitive printing sheet 73 is protected by a transparent printing sheet cover 74 openable in the forward direction and can be readily exchanged. This printing sheet cover 74 is inscribed with a datum reference line similarly as the cover 58 of the aforedescribed dictator 40. The two kinds of marks impressed on the heat-sensitive printing sheet 73 are used as indicators for the purpose of accurately locating the recorded portions on the magnetic tape by causing the tape within the cartridge 45 to travel so as to cause the marks to coincide respectively with the datum reference line inscribed on the cover 74.

When an instruction key 75 is depressed, the tape is taken up at high speed and automatically stops at the position where the I signal described thereinafter is recorded, whereupon the instruction key 75 is returned to its original position. When a fast-forward change-over switch 77 is changed over to its fast-forward side, the function of the printing key 72 becomes merely the same function as that of the rewinding key 53′, and the function of the instruction key 75 is limited to the same function as that of the fast-forward key 54 of the dictator 40, whereby the tape within the cartridge 45 merely travels at high speed respectively in the reverse direction and the forward direction to the extreme terminal end.

The foot control unit 70 is provided with a reproducing switch 78 and a rewinding switch 79, both of which are controllable by foot by a typist typing in accordance with the reproduced dictation. By actuating the reproducing switch 78, reproduction of the recorded content of the tape is carried out, and the sound thus reproduced can be heard through the earphone 80. By actuating the rewinding switch 79, the tape is rewound at high speed. When the typist's foot is lifted off the control switches 78 and 79, the transcriber 41 is placed in a stopped state.

A recall switch 82 is provided for the purpose of carrying out once rewinding for a very short period and then stopping the tape each time the tape undergoing reproduction is stopped. By keeping the recall switch 82 switched to its recall side, a very short portion (ordinarily from 3 to 5 seconds, approximately) is again reproduced when the reproducing switch 78 is again actuated. Also at the front face of the transcriber 41, there is provided a tape speed varying knob 83 whereby the tape traveling speed at the time of reproduction can be freely selected.

In the case of the transcriber 41, also, the control operations of the various control keys 53′, 72, 75, and 56′ provided on the main assembly always have priority over those of the control switches 78 and 79.

DICTATOR

The organization and operation of the internal mechanisms and circuits of the dictator 40 of an external appearance as illustrated in FIG. 2 will be described in conjunction with FIG. 4 through FIG. 7.

Figure 4:
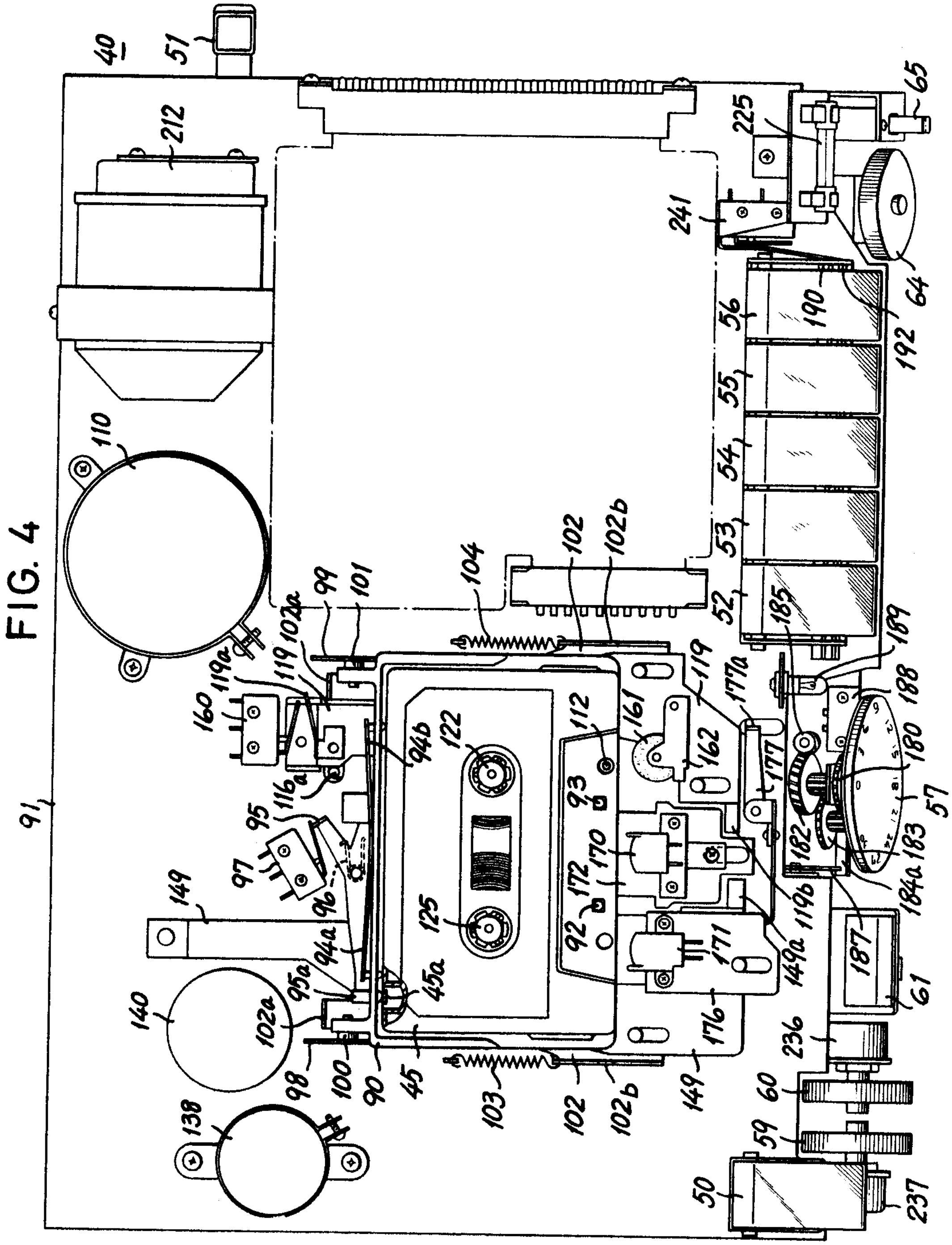
FIG. 4 is a top plan view of the dictator shown in FIG. 2 with an upper cover structure removed.
Figure 5:
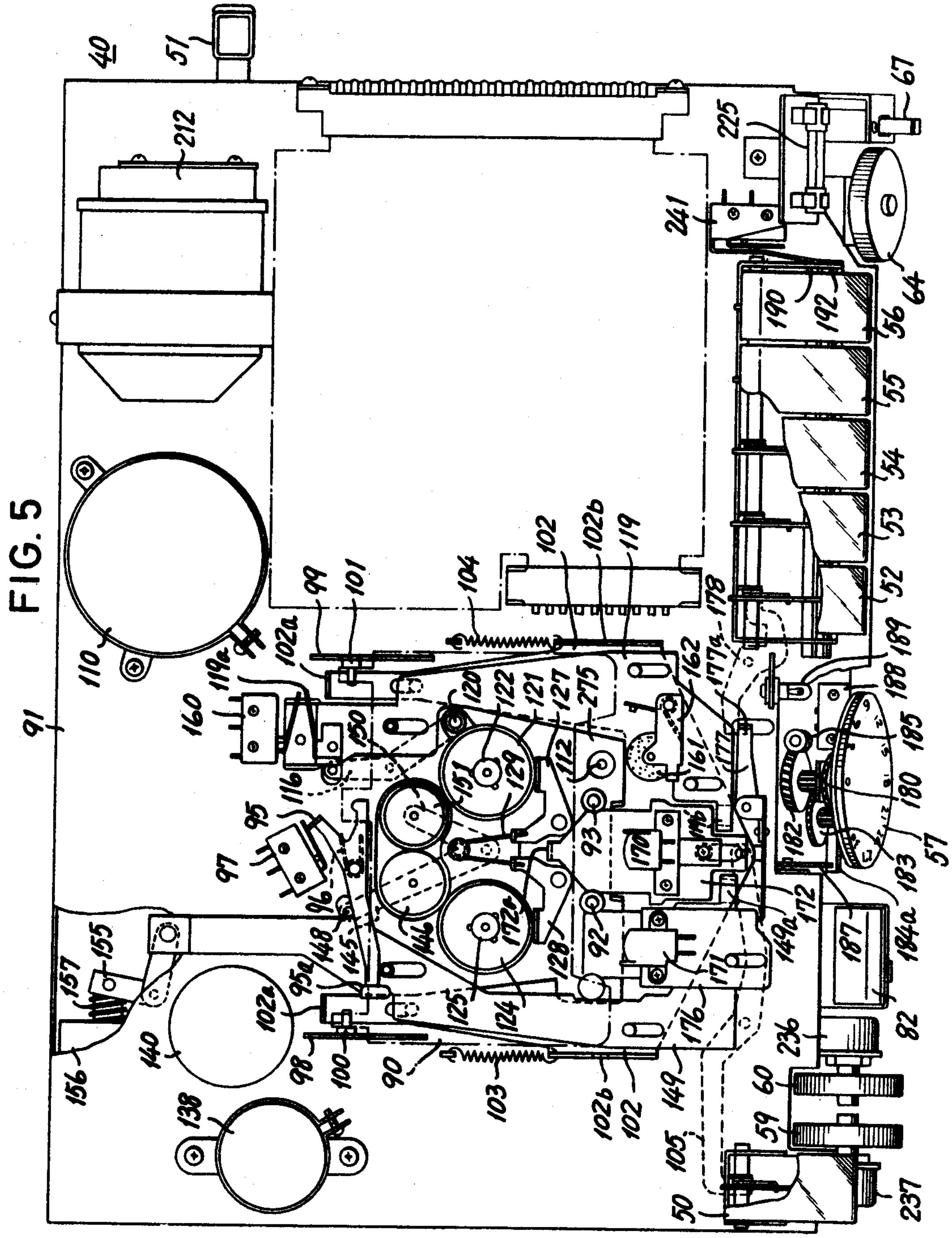
FIG. 5 is a top plan view of the same dictator with the upper cover structure and a cartridge platform removed.
Figure 6:
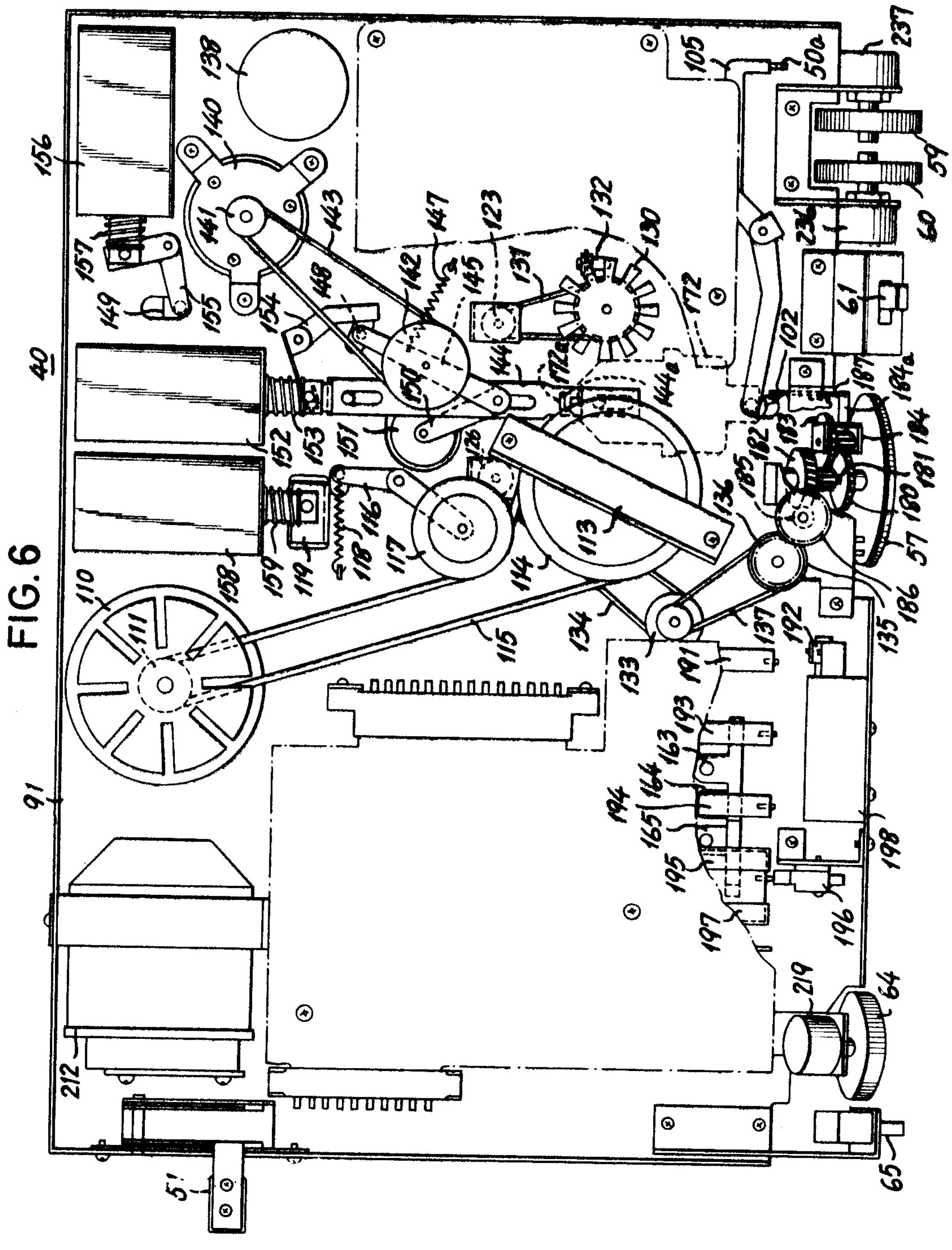
FIG. 6 is a bottom plan view of the same dictator with a lower cover structure removed.

Firstly, the organization of the internal mechanisms of the dictator 40 will be explained with FIG. 4 through FIG. 6. FIG. 4 shows the internal mechanisms of the dictator 40 with an upper cover thereof removed, FIG. 5 shows clearly a tape driving mechanism by further detaching a cartridge platform 90 on which the cartridge 45 is placed. FIG. 6 shows various mechanisms provided on the lower side of a chassis 91 in a state of having a lower cover thereof removed.

In FIG. 4, the cartridge 45 is positioned on the cartridge platform 90 in a state wherein the reel holes are engaged with a supply reel shaft 125 and a take-up reel shaft 122, respectively, and the holes provided at predetermined positions are engaged with a capstan shaft 112 and the positioning stud pins 92, 93 embeddedly fixed on the chassis 91. Furthermore, the cartridge 45 is urged to move in the forward direction by a pair of leaf springs 94*a* and 94*b*, which are fixed at a rear portion of the cartridge platform 90 and engage the rear surface of the cartridge 45, and is held at a predetermined position by engaging the positioning stud pins 92 and 93.

In the case where a record preventing tooth-like parts 45a is still provided on the cartridge 45 as illustrated in partly-sectioned state in FIG. 4, a recording preventing lever 95, following the insertion of the cartridge 45, is rotated in the clockwise direction from the position shown in FIG. 5 to a position as illustrated in FIG. 4 by engagement of the tooth-like part 45*a* with a projection 95*a* disposed at the proximal end thereof, whereby a recording preventing switch 97 changes a contact thereof, as hereinafter described. The cartridge platform 90 is rotatably supported at one side thereof by pins 100 and 101 which are embedded in a pair of brackets 98 and 99 fixed to the chassis 91 and respectively projecting in a horizontal direction, whereby it performs hop-up motion by the following operation.

Figure 38:
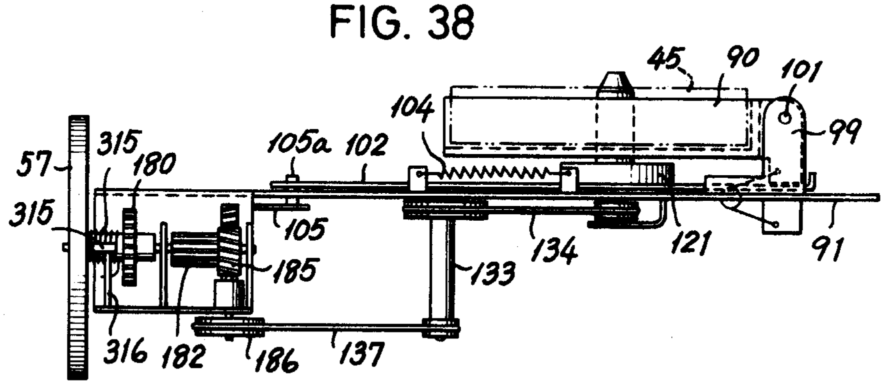
FIGS. 38 and 39 are respectively right and left side elevations of the mechanisms illustrated in FIG. 37.
Figure 39:
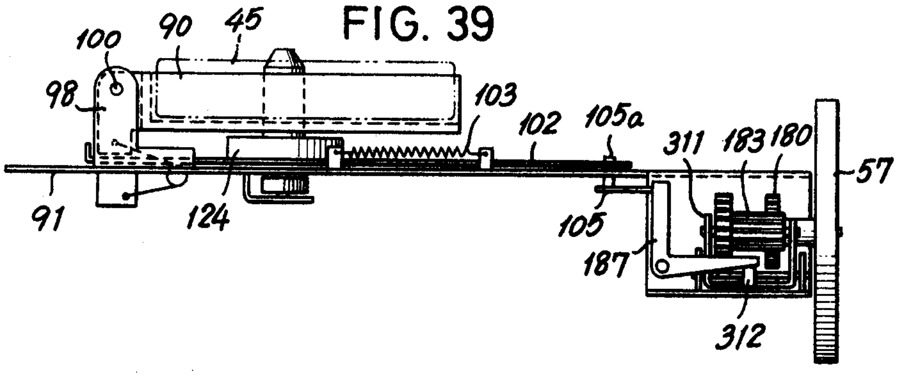
Figure 40:
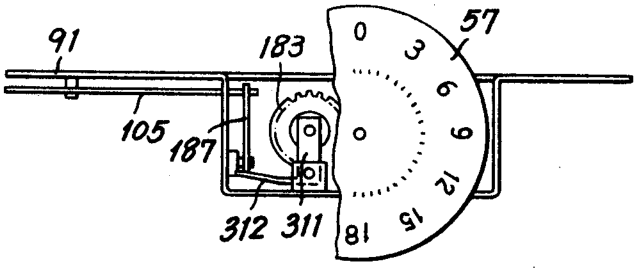
FIG. 40 is a front elevation, with a part of the time dial cut away, showing the tape indicator mechanism shown in FIGS. 37, 38; and 39.

An approximately U-shaped cartridge extraction plate 102 is slidably provided parallel to the chassis by engaging a number of pins embeddedly fixed to the chassis 91 with plural slots provided in the extraction plate 102, and normally restored to the position shown in FIGS. 4 and 5 by the tension force of the coil springs 103 and 104 which are stretched between both arms and bent parts of the chassis 91. Accordingly, the bent parts 102a provided at the extremities of both arms are separated from the cartridge platform 90 (refer to FIGS. 38 and 39), whereby the claw parts lock the cover (refer to FIG. 2) in its closed state.

A cartridge extraction lever 105 is rotatably supported on a shaft embeddedly fixed the lower side of the chassis 91, one end thereof being connected with the cartridge extraction plate 102 and the other end thereof engaging a tooth-like part 50*a* of a cartridge extraction key 50. Therefore, with depressing operation of the cartridge extraction key 50, the cartridge extraction plate 102 is pulled toward the front of the device through the cartridge extraction lever 105, and then the closed cover 49 is released from its locked state to rise, then the cartridge platform 90 is rotated with respect to the pins 100 and 101 by engagement of the bent part 102*a* of the cartridge extraction plate 102 to resume a state as shown in FIG. 2, thereby facilitating the ejecting operation of the cartridge 45 from the dictator 40.

A main motor 110 is connected to a capacitor 138 for the motor which is mounted on the chassis 91. A belt 115 is stretched between a pulley 111 of the motor 110 and a flywheel 114, which has a capstan shaft 112 projecting coaxially from the upper surface thereof and is journaled by means of a capstan bearing (refer to FIG. 9) mounted on a flywheel holder 113. The belt 115 is pushed from the outside by a take-up pulley 117 rotatably supported at one end of a take-up arm 116 and then is tightened. The take-up arm 116 is urged to rotate in the counterclockwise direction by a spring 118 in FIG. 6, but, normally, this rotation of the arm is limited at the position determined by the engagement of a pin embeddedly fixed to the other end of the arm with a slide plate for reproducing 119 placed in its inoperative position, whereby a take-up roller 120 mounted on the upper surface of the take-up pulley 117 is separated from a take-up reel support 121.

The take-up reel support 121 has the reel shaft 122 which is projecting from the upper surface thereof and the pulley 126 which is unitarily fixed thereto at the lower side thereof. Similarly, the supply reel support 124 is provided with the supply reel shaft 125 and a pulley 125 at its upper and lower sides, respectively, and is supported rotatably with respect to the chassis 91. Furthermore, in a case where the dictator 40 is in its inoperative state, the brake levers 127 and 128 disposed on the take-up and supply sides are urged to rotate in the counterclockwise and clockwise directions, respectively, and rotated to their operating positions, thereby applying brake force against the take-up reel support 121 and supply reel support 124. Between the supply pulley 123 and a vane wheel 130, a belt 131 is stretched, and at a position confronting the blade portion of the vane wheel 130, a lamp 132 attached to the chassis 91 is lit when the rewinding key 53, fast-forward key 54, or telephone recording key 55 of the dictator 40 is depressed. Consequently, when the vane wheel 130 is rotating, the light emitted from the lamp 132 is intermittently shielded by the blade portion of the vane wheel 130, whereby an automatic stopping circuit 242 (refer to FIG. 7) is retained in its inoperative condition as will be described hereinafter.

Between the take-up pulley 126 and an intermediate pulley 133 of two stage construction, a belt 134 is stretched, and further between the intermediate pulley 133 and a pulley 136, there is stretched therearound a belt 137. A gear 135 unitarily, constructed with the pulley 136 is meshed with a gear 186 which is a part of time dial mechanism described hereinafter.

A belt 143 is stretched between a rewinding pulley 142 and a pulley 141 of a take-up motor 140 which is driven by the depressing operation of the fast-forward key 54, the rewinding key 53, or the like. The rewinding pulley 142 is provided unitarily with a rewinding roller 146 at the upper side thereof, and is rotatably supported at approximately the central position of a rewinding arm 145 which is pivoted at one end thereof on the shaft embeddedly fixed to the lower surface of the chassis 91. Similarly, the rewinding arm 145 is urged to rotate in the counterclockwise direction by a spring 147 stretched against the chassis 91, but, normally, this rotation is limited at the position determined by the engagement of a pin 148, embedded at the extremity of the arm 145 and extending through an opening provided on the chassis 91, with a slide plate for rewinding 149 placed in its inoperative position, and hence the rewinding roller 146 is separated from the supply reel support 124. The slide plate for rewinding 149, as in the case of cartridge extraction plate 102, is slidably held within a predetermined range of movement by engaging the pins embeddedly fixed to the chassis 91 with the slots provided therein, and connected through a rewind lever 155 to a solenoid 156 for rewinding. Accordingly, when the solenoid 156 is in its inoperative state, the slide plate for rewinding 149 is pushed back to the inoperative position thereof as illustrated in FIG. 5.

A fast-forward arm 150 is pivoted on the shaft which also supports the rewinding arm 145, and a fast-forward roller 151 is rotatably supported at the extremity thereof. A fast-forward slide plate 144 is slidably provided within a predetermined range, similar to the rewind slide plate 149, by engaging pins with slots, and is connected to a solenoid for fast-forward 152 mounted on the lower surface of the chassis 91. A fast-forward lever 154 is rotatably supported on a shaft embeddedly fixed to the lower surface of the chassis 91, and is connected to the rod of the solenoid for fast-forward 152 at one end thereof, whereby it rotates in the clockwise direction in FIG. 6 to engage a pin 148 at its other end when the solenoid 152 is actuated. Moreover, when the fast-forward solenoid 152 is in inoperative state, the slide plate 144 is pushed back to its inoperative position shown in FIG. 6 by the force of a spring 153, and the fast-forward lever 154 is also in its inoperative position. In this state, the rewinding roller 146 and the fast-forward roller 151 extend through the openings provided on the chassis 91 and confront each other.

The slide plate 119 is also slidably supported within a predetermined range of movement and is connected to the rod of the solenoid for reproducing 158 at its base portion. When the solenoid 158 is not being actuated, the slide plate 119 is positioned in its inoperative position shown in FIG. 5 by the force of the spring 159. In this state, and engaging member 119*a* is separated from the movable contact of a muting switch 160 fixed to the chassis 91, whereby the muting switch 160 is closed. A pinch roller 161 is rotatably provided at the extremity of a pinch roller supporting lever 162 which is rotatably mounted on a shaft embeddedly fixed to the slide plate 119 and is urged to rotate in the clockwise direction by a spring but restricted in its rotation at the position illustrated in FIG. 5, and confronts the capstan shaft 112.

Nextly, the organization of the mounting portion of a recording and/or reproducing head assembly 170 and erasure head 171 will now be described. FIGS. 4 and 5 indicate the state wherein the head assembly 170 and head 171 are respectively retracted to their inoperative positions.

The recording and/or reproducing head assembly 170 is mounted on a head base 172 and is positionally adjustable. The head base 172 is slidably mounted within a predetermined range of movement and, normally, is pulled back by springs (not shown) to the inoperative position indicated in FIGS. 4 and 5. Furthermore, the head base 172 is so constructed, as hereinafter described in detail, as to move to the operative position when one of the slide plates 119, 144, and 149 for reproducing, for fast-forward, and for rewinding has traveled to its operative position. The recording and/or reproducing head assembly 170 incorporates, as hereinafter described in detail in conjunction with FIG. 7, a recording and/or reproducing head 173 for recording a message on a message recording track, a control signal recording head 174 for recording three types of control signals of E, I, and T on a control track, and a erasure head 175 for erasing the above two tracks. Moreover, a bent flange **119*b* of the slide plate 119 and a bent flange 149*a* of the slide plate 149 respectively confront the two sides of the rear surface of the head base 172 by different separating distances. With respect to a bent part 172*a* provided at the other end of the head base 172 and extending downward through an opening of the chassis 91, there is confronting a projection 144*a* of the slide plate for fast-forward 144 separated therefrom by approximately equal distance as in the case of the slide plate 149. Accordingly, when the slide plates 119, 149, and 144 are respectively moved within the slidable range determined by the engagement of the pins with the slots by the actuation of ths solenoids 158, 156 and 152, the head plate 172 slides over a specific stroke accompanying engagement of the slide plate 119 and also moves over a stroke slightly shorter than the above specific stroke accompanying engagement of the slide plates for rewinding and fast-forward 149 and 144. Consequently, during the fast-forward and rewinding modes, the head surface of the recording and/or reproducing head assembly 170 is positioned further backward by a distance of the order of 1.5 mm than the head surface furing reproducing mode, thereby applying weak contact force against the magnetic tape contained within the cartridge 45** suitable for high-speed tape travel.

Further, the brake levers 127 and 128, due to the above described slidable motion of the head base 172, are restricted by the bent flange **172*a* and respectively rotate clockwise and counterclockwise in opposition to the brake spring 129. In this manner, the application of braking force against the supply reel support 124 and the take-up reel support 122** is relieved.

The erasing head 171 similarly as with the recording transcriber head assembly 170 is adjustably positioned and fixed onto the head base 176 thrust forward under pressure from the main body proper. Normally, the head base 176 as shown in FIGS. 4 and 5 is in an unmovable position, and with the back edge force relative to its direction of motion, one end of an arm 177 axially supported on a pin embedded in the chassis 41 is in contact. Moreover, the bent flange **177*a* provided on the other end of the arm 177 passes through an opening provided in the chassis 91 and projects to the underside of the chassis. To the bent flange 177*a* of the arm 177 is affixed one end of a lever 178 whose other end is coupled to the key 52. The lver 178 is supported on a pin embedded fixed to the underside of the chassis 91. Consequently, depression of the key 52 causes in effect a displacement of the head base 176 via the medium of the lever 178, arm 177 to the side of the cartridge 45 and the head 171 with the key 52 in the locked position made to come into contact with the magnetic tape in the cartridge 45.**

An explanation is now given on the construction of the time dial mechanism. The time dial 57 under the force of a spring (not shown) is energized to rotate in the clockwise direction. Consequently, as the engagement of the gear 183 in relation to the gear 180 as later explained becomes disengaged, the clockwise rotational motion of the dial 57 becomes restricted with the abutment of a projection (not shown) provided on the back side of the dial 57 against a stop piece (not shown) which results when an "0" (zero) point on the graduated dial coincides with the datum reference line marked on the cover 58. The back-side of the dial 57 is integrally provided with a gear 180 and a revolving shaft 181, and the assembled unit is supported revolve freely inrelation to the holder. The rotating shaft 181 rotatably supports a gear 182 consisting of a large and a small gear as in integral unit and the gear 180.

The gear 182 is rotatably supported to rotate freely within a U-shaped holding member 184 which is energized with a rotational force of a specific direction. When the bent piece **184*a* provided on the holding member 184 is not withheld by the lever 187, the gear 183 is in full mesh with the gear 182 and gear 180 under the action of a spring (not shown). A worm gear 185 is in mesh with the gear 182 at its major diameter, and a gear 186 forming an integral unit with the worm gear 185 is meshed with the gear 182. Furthermore, upon depression of the cartridge ejection key 50, the U-shaped holding member 184 permits the lever 105 to rotate in the horizontal plane followed further by a rotation in the vertical plane of the lever 187, thereby causing the bent element 184*a* as fixed to be rotated and inducing the gear 183, 182 and 180 to be disengaged, allowing the time dial 57** to be returned to its zero position. The foregoing mechanism is explained in detail in a later description covering the cartridge ejection mechanism and the interconnecting tape indicator mechanism.

Figure 7:
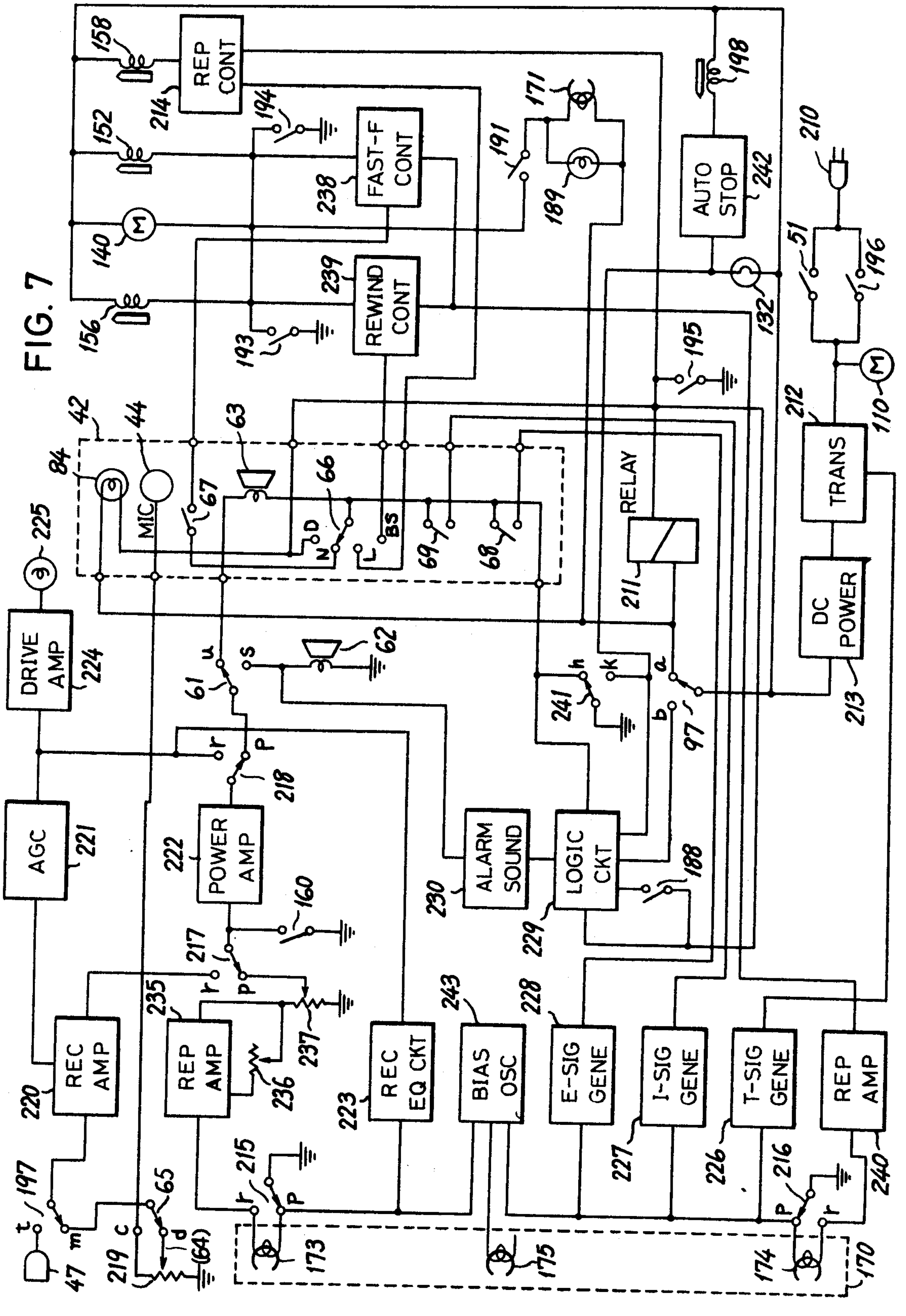
FIG. 7 is a system circuit diagram, partly in block form, showing one embodiment of an electrical circuit incorporated in a dictator as illustrated in FIG. 2.

The construction of the manipulating key portion will now be described. By holding the erasure key 52 in its depressed position, the key 52 is caused to be locked by the action of the control cam 190 when the rewind key 53 or the fast-forward key 54 is depressed to its lock position. It is in this lock position that the switch 191 is made to close. The mechanism also provides for the return of the control cam 190 to its original position and the return of the key 52 simultaneously with the release of the locked rewind key 53 and the fast-forward key 54, all accomplished with the depression of the stop key 56. The rewind key 53 and the fast-forward key 54 are respectively locked in their depressed positions upon their depression through the action of the lock cam 192 and respectively cause the rewind switch 193 and the fast-forward switch 194 to be closed. The keys 53 and 54 are freed from their locked states with the depression of the stop key 56. As described thereafter, the closure of rewind key 193 and the fast-forward switch 194 causes the respective rewind solenoid 156 and the fast-forward solenoid 152 to operate. The telephone recording key 55 becomes locked with its depressed position through the function of the locking cam 192, and in this locked position, the telephone recording switch 195 as well as the power supply switch 196 are closed irrespective of the state of the power supply switch 51, whereby the electric circuit for the transcriber circuit is closed. At the same time, the moving contact of the telephone recording changeover switch 197 switches from the contact point *m* to contact point *t* as shown in FIG. 7. Moreover, the locked telephone recording key 55 can likewise be released by depressing the stop key 56.

The locking cam 192 is displaced to its free position by depression of the stop key 56 or as described hereinafter by the release solenoid 198 actuated by the functioning of the automatic stop circuit 242. Since the control cam 190 is displaced by the action of the rewind key 53, the fast-forward key 55 or by the depression of the telephone recording key 55, the moving contact of the control changeover switch 241 changes over from the contact point *h* to the contact point *k* as shown in FIG. 7. Moreover, interlock arms 163, 164 and 165 are incorporated in the control key mechanism in order to arrest more than two keys among the control keys 52, 54, and 55 in the inoperative position in the event of mismanipulation thereby averting misoperations.

The operation of the dictator 40 having the above described construction will now be described with reference also the the circuit diagram of FIG. 7.

FIG. 7 is a circuit diagram showing the dictator 40 in a non-operative state. The manual control unit 42 is mounted on the power supply switch 51 with the four-position control switch 66 being switched to the neutral position (N). Although a power supply receptable 210 is connected to the power source, no electric current flows in the circuit of the dictator 40 because the power supply switches 51 and 196 are both open. The cartridge 45 is placed on the cartridge platform 90 and the cover 49 is pressed down to engage the tooth-like part 102*b* of the cartridge extraction plate 102 and thereby to load the cartridge 45 in a predetermined position in the dictator 40. If the lug 45*a* on the back side of the cartridge 45 has not been removed, the recording prevention lever 95 is pivoted against force of the torsion spring 96 thereby causing the movable contact of the recording preventing switch 97 to be switched from the contact point *b* to the contact point *a*. Thus, the dictator 40 is brought into a recording stand-by mode. If a recorded cartridge 45 with its lug 45*a* having been removed is loaded in the dictator 40, the movable contact of the recording preventing switch 97 remains connected to the contact point *b*. Accordingly, shifting of the four-position control switch 66 to the record D position does not actuate a relay 211 so that an erroneous recording is prevented. At this time, power is supplied to the series circuit of a logical circuit 229 and an alarm sounding circuit 230 through the contact *b* of the recording preventing switch 97 thereby actuating these circuits. The output signal of the alarm sounding circuit 230 is supplied to the speaker 62 which is assembled in the dictator 40 to sound a predetermined alarm for immediately warning the operator about his erroneous recording action.

Next to be described is the operation for recording an unrecorded cartridge 45 by means of the microphone 44 housed in the manual control unit 42.

As the control unit 42 is disconnected from the power supply switch 51, the switch 51 is automatically closed to actuate the main motor 110. The rotation of the main motor 110 is transmitted to the fly wheel 114 through the pulley 111 and the belt 115 and the capstan shaft 112 is rotated at a constant speed. The take-up roller 120 is rotated in a clockwise direction as viewed in FIG. 5 integrally with the take-up pully 117 which is in contact with the belt 115. When the four-position control switch 66 is switched from the neutral position (N) to the record position (D), the record indicator lamp 84 of the unit 42 is lit and the relay 211 is actuated to cause the movable contact of the recording-reproducing changeover switches 215 through 218 to change over from the contact points *p* to the contact points *r*. At the same time, the current from the power supply receptacle 210 is converted to a predetermined DC voltage through the power supply switch 51, a transformer 212 and a DC power supply circuit 213 and thereafter is supplied to the reproduction solenoid 158. The current further flows through the recording and reproducing control circuit 214, the control switch 66 and a control changeover switch 241 connected to the contact *h* to the ground. This actuates the reproducing solenoid 158 to move the slide plate 119 integrally with the head base 172 engaged by the bent portion 119*b*. As the slide plate 119 moves, the muting switch 160 is engaged by the engaging piece 119*a* to open the switch 160 thereby bringing the dictator into the record stand-by mode. In the meanwhile, the pinch roller 161 is pressed against the capstan 112 through the magnetic tape to drive the magnetic tape and bring the recording and reproducing head assembly 170 secured to the head base 172 into contact with the magnetic tape surface at a predetermined pressure. At the same time, the take-up reel 116 is pivoted in a clockwise direction as viewed in FIG. 5 due to the force of the spring by disengagement of the pin 116*a* from the slide plate 119. This causes the turning take-up roller 120 to be pressed against the take-up reel support 121 to transmit a rotational force thereto. Accordingly, the magnetic tape held between and driven by the capstan shaft 112 and the pinch roller 161 at a constant speed is wound on the take-up reel which is rotated by the reel support 121.

During the above described more, the audio signal from the microphone 44 is supplied through a gain adjuster 219, a recording amplifier 220, the parallel circuit of an AGC circuit 221 and a power amplifier 222, and a recording equalizing circuit 223 to the recording and reproducing head 173, and recorded on the magnetic tape. If the recording level is properly adjusted at this time, a recording level indicating lamp 225 which is connected to the output side of an indicator drive amplifier 224 is lit. If the changeover switch for conference recording 65 is switched to the conference side (C side), the recording gain is always maintained at a maximum irrespective of the adjusting position of the adjusting knob 64.

When the four-position control switch 66 is returned to the neutral position N, the relay 211 becomes non-operative and the movable contacts of the recording-reproducing changeover switches 215 through 218 are all returned to the contact points *p*. The reproducing solenoid 158 becomes non-operative because supply of electric current is interrupted. This causes the slide plate 119 to return to the original position thereby bringing the dictator 40 into the stop mode.

In general, a tape recorder performs recording operation by means of a recording head disposed at the position of the recording head assembly 170 in FIG. 5 while erasing the signal which has been recorded on the magnetic tape by means of the erasure head disposed at the position corresponding to the erasure head 171 in the same figure. In the aforementioned dictator 40, however, the following recording procedure is employed. The portion recorded immediately before is reproduced, and newly recorded portions are formed while amending is partly effected. Accordingly, in the case where the construction and dispositions of the magnetic heads are arranged similar to those in the aforementioned tape recorder, the rewound, magnetic tape exsisting between the recording head and the erasure head is not yet erased. Furthermore, a new signal will be recorded on this portion in a superimposed state, which is very inconvenient. For instance, when the tape travel speed is 4.8 cm/sec, and the distance between the erasure head and the recording head is approximately 25 mm, the superimposed recording is made over an interval of about 0.5 second. Therefore, the recording and/or reproducing head assembly 170 provided in the above dictator 40 additionally incorporates the erasure head 175 which is caused to assume its operative state by a bias circuit 243 during the recording mode.

During the aforementioned message recording mode, the recording head 173 records the message signal on one track of the magnetic tape, while the signal recording head 174 records the output signal from a T-signal recording circuit 226, i.e., T-signal (a signal indicating the section over which the message is recorded) on another track of the magnetic tape, as described hereinafter in detail. According to one embodiment of the present invention, the power source frequency (for example 60 Hz) is adapted for the T-signal, and an oscillator for the signal is not required. The T-signal is utilized for as a signal indicating the starting point when the fast-forward operation by the control unit 42 is performed. Furthermore, during recording operation, a dictating person mainpulates an E-signal recording switch 68 provided in the control unit at the beginning and/or the end of the message to close the same temporarily, and then an E-signal generating circuit 228 is actuated. Consequently, the E-signal (a signal indicating the beginning and/or end positions of one message) is recorded on the magnetic tape during a specific period of time by means of the signal recording head 174 similarly as in the above recording procedure. The E-signal serves, while the dictator 40 is performing high-speed rewinding by the operation of the control unit 42, to stop the magnetic tape automatically in response to the detection of the same signal. Moreover, the temporarily depressing manipulation of an I-signal recording switch 69 causes an I-signal generating circuit 227 to operate, and then the I-signal (a signal for indicating the position of the instructions and the like for the secretary in the case of reproduction of the magnetic tape) is recorded over a specific period of time by means of the same control signal recording head 174 through a circuit described hereinafter. The I-signal serves, while the transcriber 41 is performing high-speed taking up by the depressing manipulation of the instruction key 75, to stop the magnetic tape automatically in response to the detection of the same signal.

Moreover, with regard to the frequencies and the recording states of the above T, E and I signals, detailed description will be set forth in the sections on "recording and descriminating method of T, E and I signals," "recording method and circuit of the signal," and "recording circuit for E and I signals (one-shot multivibrator circuit)."

The control and operation of recording an audio signal from the telephone 46 will be described. As a result of the depressing manipulation of the telephone recording key 55 of the dictator 40, the power supply switch 196 is successively closed, and then the telephone recording switch 195 is closed. Accordingly, even if the power supply switch 51 is opened when the manual control unit 42 is placed on the same switch 51, the required DC voltage is continuously supplied to the solenoid 158, in the same manner as in the above recording operation by the microphone 44, and then through the recording and/or reproducing control circuit 214, and the telephone recording switch 195 is grounded. Consequently, the magnetic tape contained in the cartridge 45 is clamped and driven by the capstan shaft 112 and pinch roller 161, and at the same time, the recording head assembly 170 is brought into contact therewith.

On the other hand, by the depressing manipulation of the telephone recording key 55, the movable contact of a telephone recording changeover switch 197 is changed from a contact point *m* to a contact point *t*. Accordingly, the input signal from a telephone pickup 47 is passed through the recording amplifier 220, the AGC circuit 221, the power amplifier 222, the recording equalizing circuit 223, and the like, in the same path as the above recording operation from the microphone 44, and then recorded on the magnetic tape, with maximum recording gain, by the recording head 173 incorporated in the head assembly 170. At this time the four-position control switch 66 of the control unit 42 is set of the neutral position N, and whereby the recording indicating lamp 84 is not lit. Moreover, since the E-signal recording switch 68 and the I-signal recording switch 69 are respectively locked at their opened positions, both the E-signal and the I-signal will not be recorded while the communicating contents from the telephone 46 is being recorded, and only the T-signal is recorded on the track for the control signal.

When the stopping key 56 of the apparatus is depressed, the telephone recording key 55 is caused to release the lock thereof and is restored to its original position, whereby the power supply switch 196 and the telephone recording switch 195 are both opened. Accordingly, the reproducing solenoid 158 is rendered inoperative, causing the travel of the magnetic tape to be stopped. Furthermore, the movable contact of the telephone recording changeover switch 197 is changes over from the contact *t* to the contact *m*, and the input signal from the telephone pickup 47 is cut off.

The reproducing manipulation and operation of the cassette tape in the dictator 40 will now be described. At the time when the magnetic tape inside of the cartridge 45 in its rewound state by the rewinding operation as described hereinafter is to be reproduced, the four-position control switch 66 of the manual control unit 42 is changed over to the reproducing position L, and whereby the current is supplied through the recording-reproducing control circuit 214 to the solenoid 158, in the same manner as in the recording operation, causing it to be activated. Consequently, the magnetic tape is driven to travel in the forward direction, the head assembly 170 being in contact therewith. As this time, since the changeover relay 211 is in its inoperative stage, each movable contact of the changeover switches 215 through 218 is maintained connected to its contact point *p*. Accordingly, the dictated message signal reproduced by the head 173 is supplied to a reproducing amplifier 235 and a variable tone controller 236, which is approppriately adjusted by the rotation of a tone control knob 60 additionally connected thereto, and then transmitted through a variable sound volume controller 237 appropriately adjusted by a sound volume control knob 59 and the power amplifier 222 to the loudspeaker 63 incorporated within the control unit 42. Thus, the message which was recorded as described hereinbefore is reproduced and heard from the same speaker 63. Moreover, when the movable contact of a loudspeaker changeover switch 61 is changed over to a contact *s*, the message is reproduced from the loudspeaker 62 incorporated within the dictator 40.

The fast-forward and rewinding control manipulation and operation in the dictator will now be described. First, the fast-forward control manipulation and operation will be described. The fast-forward key 54 of the dictator 40 is depressed to be locked when the control switch 66 has been set to the neutral position N as shown in FIG. 2, whereby the fast-forward switch 194 is closed to cause the fast-forward solenoid 152 and the take-up motor 140 to operate. As result the action of the solenoid 152, the rod thereof is drawn counter to the spring 153, and then the lever 154 is rotated in the clockwise direction, as viewed in FIG. 6. As a result of the rotation of the lever 154, one arm portion thereof engages with the pin 148, whereby the arm 145 is rotated in the clockwise direction in FIG. 5. Accordingly the roller 146 engages with the roller 151 to make it rotate together with the arm 150, causing the roller 151 to be pressed against the take-up reel support 121. At the same time, the rotation of the pulley 141 driven by the take-up motor is transmitted through the belt 143 to the rewinding pulley 142 as a clockwise rotation as viewed in FIG. 6, and further transmitted through the rewinding roller 146 and the fast-forward roller 151, to the take-up reel support 121 as a counterclockwise rotation in FIG. 5. Consequently, the magnetic tape contained in the cartridge 45 is run at high speed. Moreover, as a result of the depressing manipulation of the stop key 56, the fast-forward key 54 is unlocked and restored to the original position thereof, whereupon the dictator 40 assumes its stop mode.

The fast-forward operation can also be accomplished by the manipulation of the manual control unit 42. In this case, in the state wherein the control switch 66 has been set to the neutral position N, the fast-forward switch 67 is depressed to close the fast-forward switch 67, whereupon a closed circuit consisting of a solenoid 152, the take-up motor 140, the fast-forward control circuit 238, the closed switch 67, the control switch 66 connected to the neutral position N, and the control changeover switch 241 is formed in the same manner as in the above-described reproducing mode. Consequently, the solenoid 152 and the motor 140 are activated, whereby the magnetic tape in the cartridge 45 starts to travel at high speed in the forward direction.

The fast-forward control circuit 238, as described hereinafter in detail, is maintained in its operating state as long as the T-signal, which is detected by the head 174 and amplified by the reproducing amplifier 240, is being applied. But when the supply of the T-signal ceases, the control circuit 238 is rendered inoperative, whereupon the electric circuit including the solenoid 152 and the motor 140 is opened, and the dictator 40 is instantaneously and automatically converted to the stop mode. The above automatic stopping circuit will be described in detail in a section on "automatic stopping circuit which is operated due to non-detecting of the T-signal."

The rewinding control manipulation and operation will now be described. As a result of the depressing manipulation of the rewinding key 53 to its locked position, the rewinding witch 193 is closed, whereby the rewinding solenoid 156 and the take-up motor 140, as in the case of the above fast-forward control manipulation, are activated. As a result of the activation of the solenoid 156, the rod thereof is drawn counter to the force of the spring 157, whereupon the slide plate 149 is moved through the lever 155, and the engagement of the pin 148 embeddedly fixed to the arm 145 at the extremity thereof is released. Accordingly, the arm 145 is rotated in the counterclockwise direction, as viewed in FIG. 1, by the tension of the spring 147, and the roller 146 rotated by the motor 140, as in the case of the fast-forward operation, is pressed against the supply reel support 124. Consequently, the supply reel support 124 is rotated in the clockwise direction at high speed, as viewed in FIG. 5, causing the magnetic tape to be rewound at high speed.

The rewinding operation also can be accomplished by the changeover manipulation of the four-position control switch 66 of the manual control unit 42 to the rewind (BS) position. When the control switch 66 is changed to the rewind (BS) position, the output current of a specific DC voltage which has been supplied to the solenoid 156 and the motor 140, as in the case of the above fast-forward operation, is further supplied through a rewind control circuit 239, the control switch 66, and the control changeover switch 241, and then to the ground point. Therefore, the solenoid 156 and the motor 140 are respectively operated, and the magnetic tape contained in the cartridge 45 is rewound at high speed, similarly as in the above description. Moreover, the rewind control circuit 239 is automatically rendered inoperative, as described hereinafter, when the E-signal (recorded immediately before or after one message), which will be reproduced by the head 174 and amplified by the reproducing amplifier 240, is applied. Consequently, the circuit including the rewind solenoid 156 and the take-up motor 140 is opened, and each mechanism is restored to its original state. This automatic stopping circuit will be described hereinafter in the section on "automatic stopping circuit operable due to the detection of the E-signal."

Moreover, in an additional method for automatically stopping the dictator in its rewinding state, the dictator is automatically stopped when the reproduction of the T-signal ceases during the rewinding operation, while on the magnetic tape, the unrecorded portion of the T-signal is formed over a specific range corresponding to several seconds from the position from which the message is recorded. This recording operation and the circuit for automatic stopping will be respectively described in detail in the sections on "recording operation and circuit for signal," and "automatic stopping circuit operated by the non-detection of the T-signal."

The high-speed erasing operation will now be described. In the state wherein the control switch 66 of the manual control unit 42 is positioned at the neutral position N, the erasure key 52 of the dictator 40 is depressed and at the same time the rewinding key 53 or the fast-forward key 54 is also depressed. The erasure key 52 is locked by the control cam 190, and then an erasure indicating lamp 189 is lit.

The rewinding key 53 of the fast-forward key 54 is locked by the locking cam 192. Accordingly the erasure head 171 for erasing all tracks is rendered operative by closing of the switch 191 and, at the same time, is displaced toward the cartridge 45 counter to the force of a spring (not shown) together with the head base 176 by the rotation of the lever 178 and the arm 177 to the position contacting the magnetic tape traveling at high speed in the forward or reverse direction, whereby all tracks (generally four tracks) of the magnetic tape are erased at high speed. However, in the case where the lug 45a of the cartridge 45 positioned at a specific place is removed, the movable contact of the recording preventing switch 97 is maintained at the contact point *b* as mentioned hereinbefore. Therefore, the erasing operation is not performed. When this operating mode of the apparatus is to be stopped, the stopping key 56 is depressed to move the locking cam 192 to its inoperative position, and then the fast-forward key 54 or the rewinding key 53 is released from its locked state and restored to its original position. Furthermore, since the control cam 190 is returned to the operative position thereof, the erasure key 52 is also restored to its original position, whereby the dictator 40 is caused to assume the stop mode. The order of priority between the manipulation of the manual control unit 42 and that of the dictator proper 40, as to each of the aforementioned manipulations, will now be described. When the dictator 40 is performing the recording or reproducing operation by the manipulation of the control unit 42, wherein the four-position control switch 66 is changed over to the recording position (D) or the reproducing position (L), if the depressing manipulation of the rewinding key 53, the fast-forward key 54, or the telephone recording key 55 is carried out, the movable contact of the control changeover switch 241 will be changed from the contact point *h* to the contact point *k* by the movement of the control cam 190, and hence the dictator 40 will be changed in operational mode from the recording or reproducing mode to the rewinding, fast-forward, or telephone recording mode. Moreover, at this time the movable contact of the switch 66 is connected to the contact point D or L, and then the logical circuit 229 and the alarm sounding circuit 230 are activated, whereupon an alarm sound is emitted from the loudspeaker 62 to inform the operator of the mis-manipulation. The alarm sounding circuit and its organization will be described in the section on "alarm device."

Next, the automatic stopping operation will be described. This operation changes over the dictator 40 automatically to the stop mode irrespective of the presence or absence of the aforementioned control signals when the magnetic tape (or cassette tape) within the cartridge 45 is caused to run to its extremity in the forward or reverse direction by the manipulation of the above-described several keys. In the state wherein the rewinding key 53, the fast-forward key 54, or the telephone recording key 55 incorporated within the dictator 40 is depressed to its locked position, and hence the dictator 40 is changed to the corresponding mode, and movable contact of the control changeover switch 241 is changed from the contact point *h* to the contact point *k* by the slide of the control cam 190, whereby the lamp 132 provided on the lower surface of the chassis is turned on. When the magnetic tape is traveling within the cartridge, the rotation of the pulley 123 unitarily rotating with the supply reel support 124 is transmitted by way of the belt 123 to the vane wheel 130. Therefore, with respect to the light-sensitive member (not shown) disposed at a position confronting the lamp 132 with the vane wheel 130 being placed therebetween, the light projected from the lamp 132 is repeatedly passed and shielded by the blades of the rotating vane wheel 130. Accordingly, an automatic stopping circuit 242 is supplied with a rotating signal from the light-sensitive member (not shown) and is kept in the inoperative state, whereby a release solenoid 198 is maintained in the inoperative state.

However, when the magnetic tape within the cartridge 45 travels to its extremity in the forward or reverse direction, and the rotation of the reel support 124 stops, the rotation of the vane wheel 130 also stops. Therefore, the lamp 132, with respect to the light sensitive member, is exposed or shielded by the blade portion of the vane wheel 130, and is kept in either state. Accordingly, with the stopping of the rotating signal, the aforementioned automatic stopping circuit 242 is temporarily rendered operative, whereupon the solenoid 198 is activated. As a result of the activation of the solenoid 198, the locking cam 192 which has been locking one of the aforementioned keys 53, 54, 55 is moved to its release position, and the dictator 40 is automatically stopped. The organization and operation of the automatic stopping circuit will be described in the section on "automatic stopping circuit provided with protection circuit."

TRANSCRIBER

Figure 8:
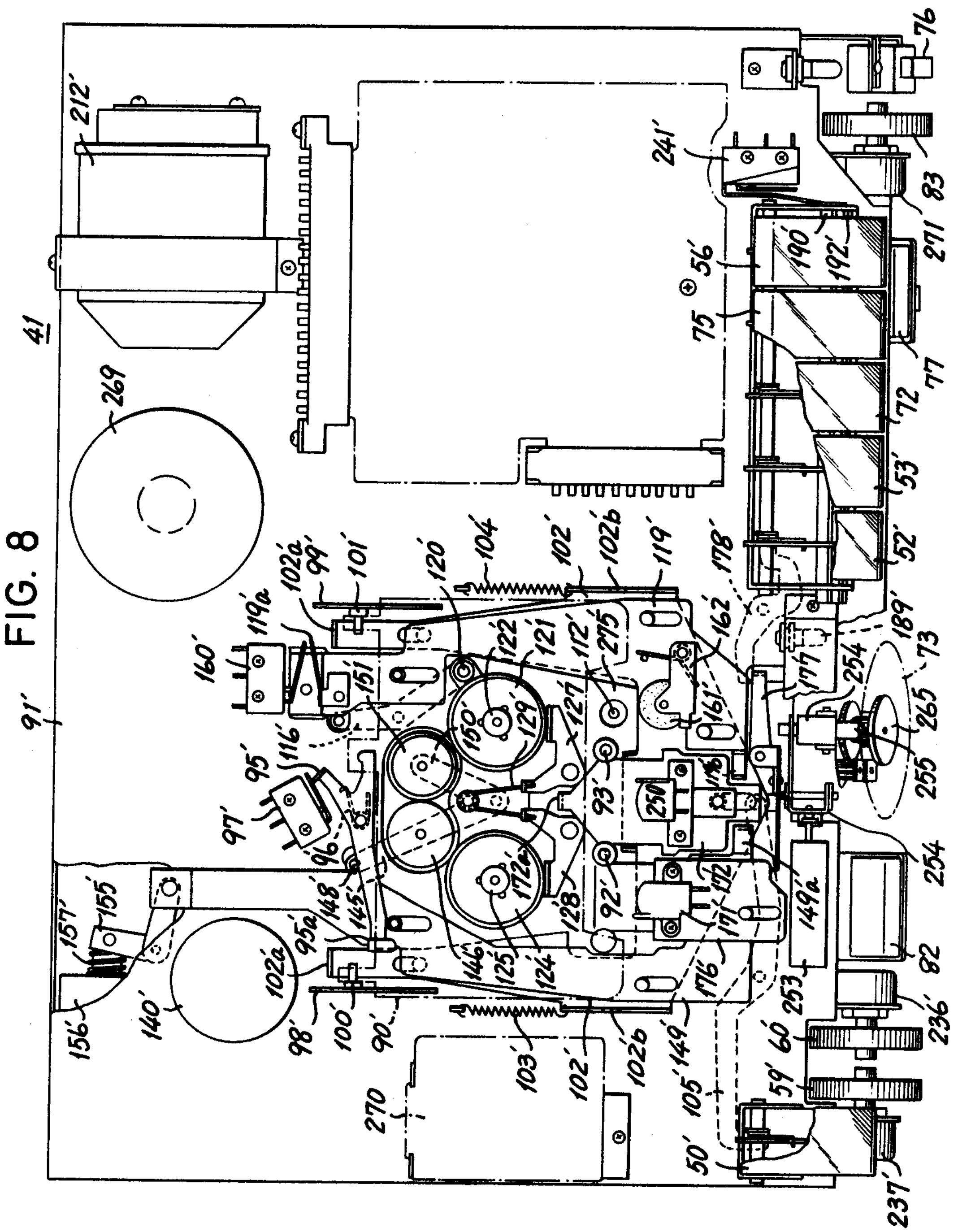
FIG. 8 is a top plan view of the transcriber illustrated in FIG. 3 with an upper cover structure removed.
Figure 9:
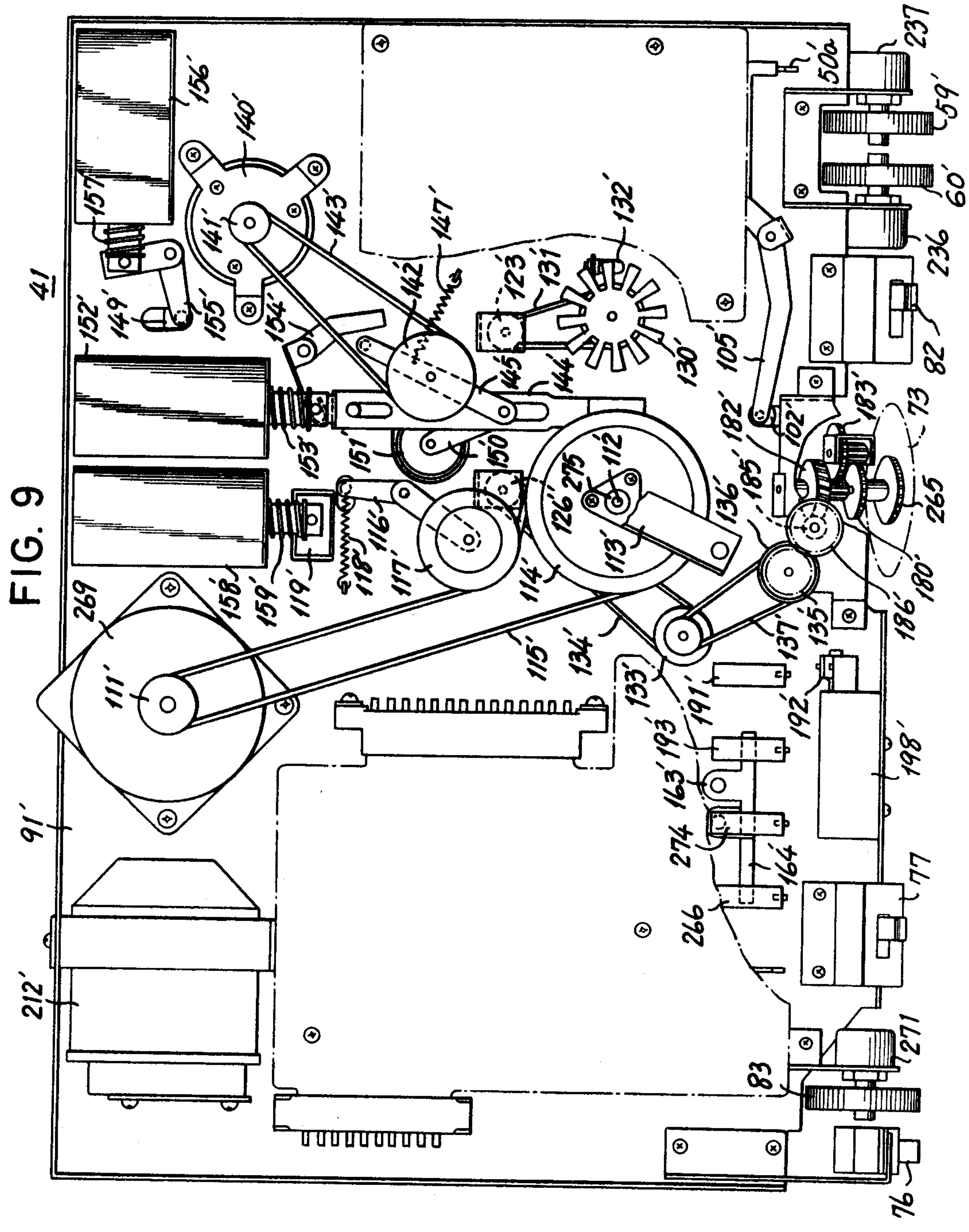
FIG. 9 is a bottom plan view of the same transcriber with a lower cover structure removed.
Figure 10:
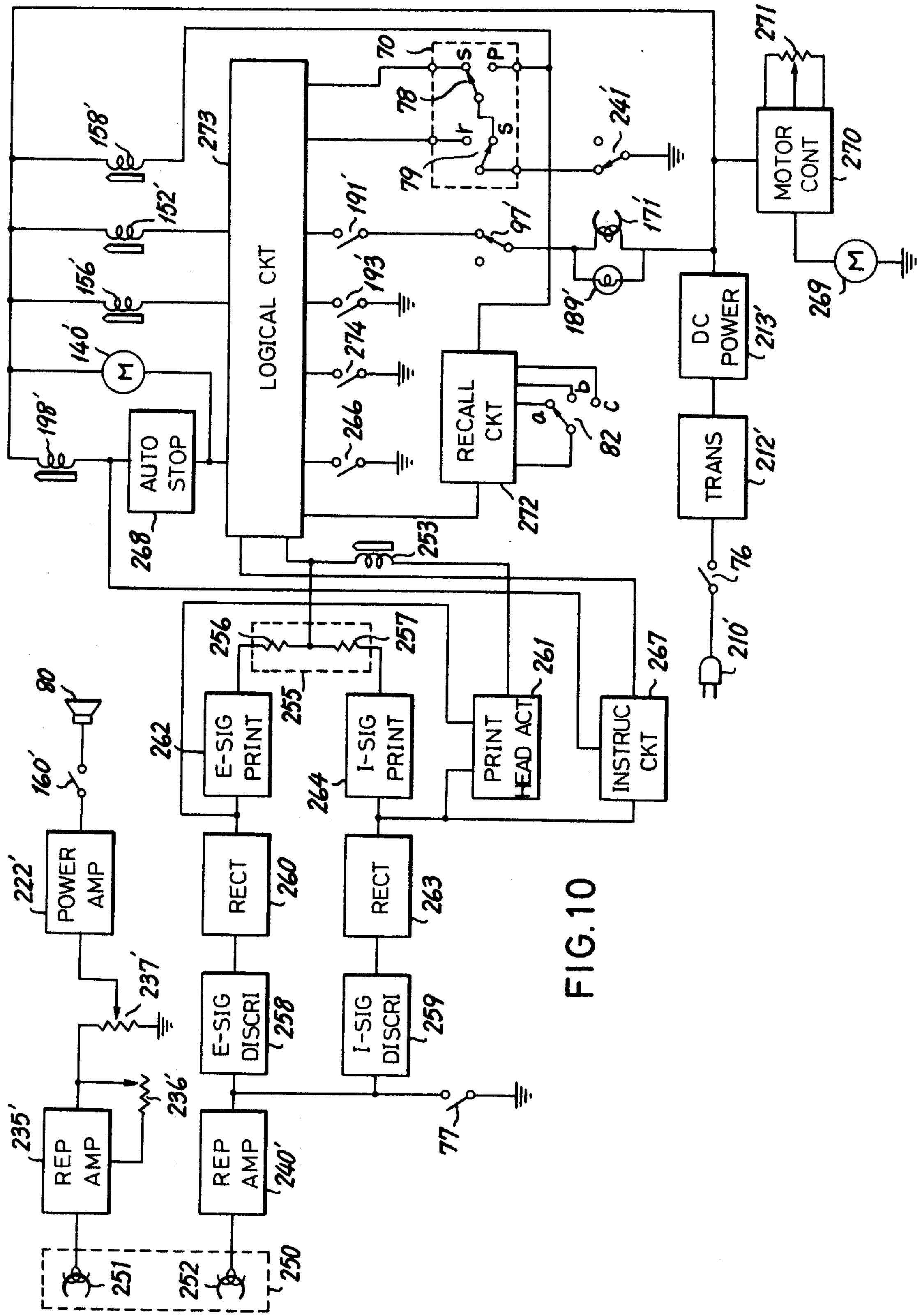
FIG. 10 is a system circuit diagram of an embodiment of an electrical circuit incorporated in the same transcriber.

With reference to FIGS. 8 through 10, a description will now be given of the operation and construction of one embodiment of the transcriber of the dictation recording system of the present invention. Parts in the transcriber 41 which are identical to those in the dictator 40 are designated by like reference numerals with the addition of prime designation. Detailed description of these parts is omitted.

Since the driving mechanism for the magnetic tape in the transcriber 41 is generally identical in composition to that in the dictator 40 described previously, only those particular points of differences will be described hereinbelow. The transcriber head assembly 250 differs from the head assembly 170 in the dictator 40 in that it integrally contains a reproducing head 251 and a control signal reproducing head 252. Furthermore, the printing mechanism differs from the time indicator in the dictator 40 in that it is provided with a heat-sensitive printing sheet 73 in place of the time dial 57 and provided additionally with a solenoid 253 for printing, an arm 254 for the printing head and a printing head 254. However, the automatic reset mechanism provided in the case for the tape indicator mechanism is eliminated. The printing head 255 is comprised of an E-signal printing head 256 and an I-signal printing head 257. Moreover, the main motor 269 provided in the transcriber 41 is coupled to a motor controller 270 and a speed regulator 271 whereby by adjusting the speed regulator 271 through appropriate rotation of the tape speed varying knob 83, the rotational speed of the motor shaft can be adjusted at will.

A description will now be presented on the manipulation and operation of the transcriber 41. First, the cartridge 45 containing the magnetic tape with the oral contents and the control signals recorded persuant to the manipulation of the dictator 40 described previously is placed in loaded position in the transcriber 41. The action and the manner in which the marks corresponding to the E-signal and I-signal recorded in the magnetic tape are recorded on different concentric circles of the heat-sensitive printing sheet 73 simultaneously at the time of rewinding the tape will now be described.

After insertion of the plug 210′ into the power supply receptacle 210′, the transcriber 41 is placed in a standby state when the power supply switch 76 is closed. Upon depression of the printing key 72, the printing switch 274 closes, and the electric current from the power supply via the transformer 212′ and the DC electric circuit 213′ causes the take-up motor 140′ and the rewind solenoid 156′ to operate, thereby causing the magnetic tape contained within the cartridge 45 to be rewound at high speed similarly as in the case of the dictator 40. The transcriber head assembly 250 is pressed lightly in contact with the surface of the magnetic tape, and through the medium of the reproducing head 252, the E and I-control signals are intermittently detected.

The E-signal reproduced by the signal reproducing head 252 after amplification by the signal reproducing amplifier 240′ is passed to an E-signal discrimination circuit (band-pass filter) 258 and to an I-signal discrimination circuit (high-pass filter) 259. Of these, the frequency band range within the E-signal is passed through the signal discrimination circuit 258 and supplied to a signal rectifier circuit 260. Succeedingly the E-signal is passed to a printing head activating circuit 261 and to a signal printing circuit 262 and placed into the state of operation. Therefore, the printing solenoid 253 is activated by the head operating circuit 261, and the printing head 255 is actuated through the printing head arm 254 and brought into pressure contact with the heat-sensitive printing sheet 73, which is rotating in relation to the travel of the magnetic tape. Simultaneously, an E-mark is printed on the heat-sensitive printing sheet 73 for a predetermined period of time since the E-signal printing head 256 becomes heated with the operation of the E-signal printing circuit 262.

Moreover, in the case when the I-signal is detected and reproduced by the original reproducing head 252, the I-signal after amplification in the signal reproducing amplifier 240′ and detection by means of the I-signal discrimination circuit 259 is passed succeedingly to an I-signal rectifier circuit 263. The I-signal, similarly as in the case of the E-signal, is further supplied to the printing head operating circuit 261 and to an I-signal printing circuit 264 and, with the activation of the printing solenoid 253, heats the I-signal printing head 257. As a result, the printing head 255 causes an I-mark to be printed for a predetermined period of time on a track different from the E-mark recording track of the heat-sensitive printing sheet 73 rotating in relation to the travel of the magnetic tape.

The circuit organization for predetermined time printing will be described in the section on one-shot multivibrator circuits for E and I-signal recording.

Now when the changeover switch 77 for fast forwarding is manipulated and closed the output side terminal of the signal reproducing amplifier 240′ becomes grounded, wherefore the control signal reproduced by the signal reproducing head 252 at the time of the above described rewinding operation is not supplied to the E-signal and I-signal discrimination circuits 258 and 259. For this reason, only tape rewinding is effected and no printing is carried out on the heat-sensitive printing sheet 73.

Further, the heat-sensitive printing sheet 73 rotates with a printing sheet base 265, which rotates at a substantially reduced speed compared with the rotation of the take-up reel base 121′ driven by the travel of the magnetic tape, which rotational motion is transmitted to pulley 126′, belt 134′, intermediate pulley 133′, belt 137′ and pulley 136′, and which rotation is reduced through gear 135′, 186′, worm gear 185′, gear 182′, 183′ and 180′. The rotational angle corresponds to the amount of travel of the magnetic tape. In the above embodiment, the angular displacement of the printing sheet base 265, i.e., the heat-sensitive printing sheet 73 is 300° in relation to the total length of travel of the magnetic tape contained in the cartridge 45.

Next, the manipulation for fast forward and the automatic stop action as effected by the I-signal in the course of action of fast forward manipulation will be described.

The depression of the instruction key 75 causes an instruction switch 266 to close and the power supply circuit for the fast-forward solenoid 152′ and the take-up motor 140′ to close. As a result, the magnetic tape contained within the cartridge 45 is traveled in the normal direction at high speed through a mechanism similar to that in the case for the above mentioned dictator 40. In this instance, the I-signal recorded on the magnetic tape when reproduced by the signal reproducing head 252 is supplied to an instruction circuit 267 via the signal reproducing amplifier 240′, I-signal discrimination circuit 259, and I-signal rectifier circuit 263. Accordingly, the switching transistor in the instruction circuit 267 is switched on and connects the solenoid 198′ to the logical circuit 273, thereby forming a closed, grounded circuit comprising the power supply, solenoid 198′, instruction circuit 267, logical circuit 273, and instruction switch 266. Thereupon, the solenoid 198′ operates. Consequently, and similarly as in the case of the dictator 40, the locking cam 192′ is activated, and the instruction key 75 in its depressed position is released from its locked state and returns to its original position. The transcriber 41 is placed in a stand-by state, and the travel of the magnetic tape is brought to a stop. In the above described manipulation, if the stopping is effected preliminarily to close the changeover switch 77 the signal reproduced by the reproducing head 252 will not be supplied to the I-signal discrimination circuit 259, whereby an automatic stopping by the I-signal will not be effected, but only fast-forward traveling of the magnetic tape will be carried out.

The following description treats with the reproducing and rewinding operation as effected by the manipulation of a foot control unit 70, as shown in FIG. 10, in which the foot control unit 70 is shown with the reproducing switch 78 in a inoperative state and the connection of the rewind switch 79. The depression of the reproducing switch 78 by foot causes the movable contact to switch from contact points *s* to contact point *p* thereby energizing the reproducing solenoid 158' and the reproducing slide plate 119' displaced to its working position. On the other hand, the main motor 269 provided with the motor controller 270 and speed regulator 271 revolves at a constant speed. Consequently, the magnetic tape contained in the cartridge 45 and clamped between a capstan shaft 112' and the pinch roller 161' is made to travel in the forward direction along the head face of the reproducing head assembly 250. At this time, the muting switch 160' is made to close, and for this reason, the audio signal reproduced by the reproducing head 251 in the reproducing head assembly 250 is amplified in the reproducing amplifier 235' and thereafter adjusted for tone quality and volume in the tone controller 236' and variable volume controller 237', respectively. After a further amplification in the power amplifier 222', the signal is reproduced by a earphone 80.

When the foot pressure is removed from the reproducing switch 78 and the movable contact is switched back to the contact point *s* side, the circuit of the reproducing solenoid 158' is opened and the contact pressure of the pinch roller 161' against the capstan shaft 112' is removed, which in turn stops the travel of the magnetic tape. Simultaneously, a recall circuit 272 as described hereinafter and a logical circuit 273 are activated, and the rewind solenoid 156' and the take-up motor 140' are made to operate for a short period of time. Consequently, the magnetic tape after a first brief stop travels in reverse a small distance and comes to a full stop at the reversed point. Further, the operating time of the rewinding solenoid 156' and the take-up motor 140' can be set for different times by changing the contact points of the movable contact of the three point recall switch 82 to contact points *a*, *b* and *c* as shown in FIG. 10. For example, when the movable contact is switched to the position *a*, the magnetic tape is brought to a stop promptly without being rewound from its reproduced state.

Now with respect to the circuit for temporary rewinding, this is described in detail on the subject of the autorecall circuit presented hereinafter.

Further, when the movable contact is switched over from the contact point *s* to the contact point *r* with the depression of the rewind switch 79 by foot, the rewinding solenoid 156' and the take-up motor 140' are activated, and the transcriber 41 is placed in a rewinding mode. Conversely, when the foot is removed from the rewind switch 79, and the movable contact is switched from the contact point *r* to the contact point *s*, the transcriber 41 reverts to a stopped state.

Furthermore, in the event that any one of the keys, i.e., rewinding key 53', printing key 72 and instruction key 75 is in a depressed state and in a locked condition, the control cam 190' is displaced, and since the control change switch 241' is in an open condition, the mode of the transcriber 41 will not change even though the reproducing switch 78 or the rewind switch 79 on the foot control unit 70 is switched. In other words, the mode of the control keys on the transcriber 41 takes priority at all times over the control mode of the foot control unit 70.

The control manipulation for high speed erasure will now be described. Similarly as in the case of the dictator 40, the rewind key 53' is depressed with the erasing key 52' held in the depressed state, and the erasing switch 191' and the rewind switch 193' are closed by holding the keys 52' and 53' in a locked position. This procedure causes the erasure indicating lamp 189' to be lit and also places the transcriber 41 in the rewind mode. Furthermore, the depression of the erasing key 52' causes the erasing head base 176' to be moved over to the cartridge 45 by the action of the erasing arm 177' and erasing lever 178'. In this manner, the erasing head 171' for full width erasure comes into contact with the magnetic tape. In the event that the loaded cartridge 45 is not provided with the lug 45*a*, the recording prevention switch 97' will be in an open state thereby preventing any erroneous erasing by the erasing head 171'.

In the above control manipulation relating to the forward and reverse travel of the magnetic tape, the tape will be paid out to its extreme terminus, and when the rotation of both reel discs 121' and 124' comes to a stop, an automatic stopping circuit 268 starts to function irrespective of the detection and reproduction of each control signal in the signal reproducing head 252 similarly or in the case of the dictator 40, whereby the release solenoid 198' functions and plans the transcriber in a stop mode.

Figure 11:
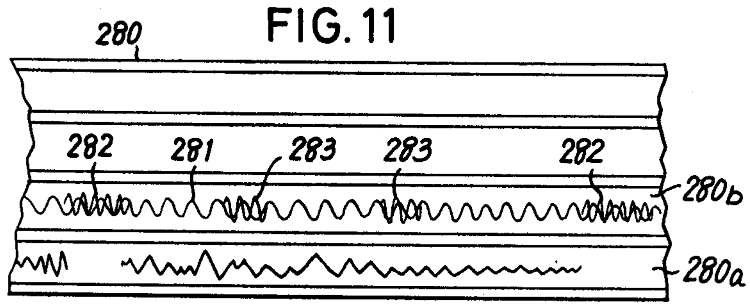
FIG. 11 is a track pattern indicating the manner in which control signals and message signals are recorded on the magnetic tape by the dictator.

In the foregoing dictation recording and reproducing system and as a convenience in control manipulation of the apparatus, three kinds of control signals are used. E-signal: this signal is used to indicate the start of a messsage and/or its end. I-signal: this signal is used in the event of indicating the locations of instructions to the secretary at the time of playback of the tape. T-signal: this signal is used to indicate the section in which a message is recorded. These three control signals as indicated in the tape 280 in FIG. 11 are doubly recorded, i.e., the control signal on the control signal recording track 280*b* differing from the message signal recording track 280*a* and the control signals are recorded in the audible frequency range.

Figure 12:
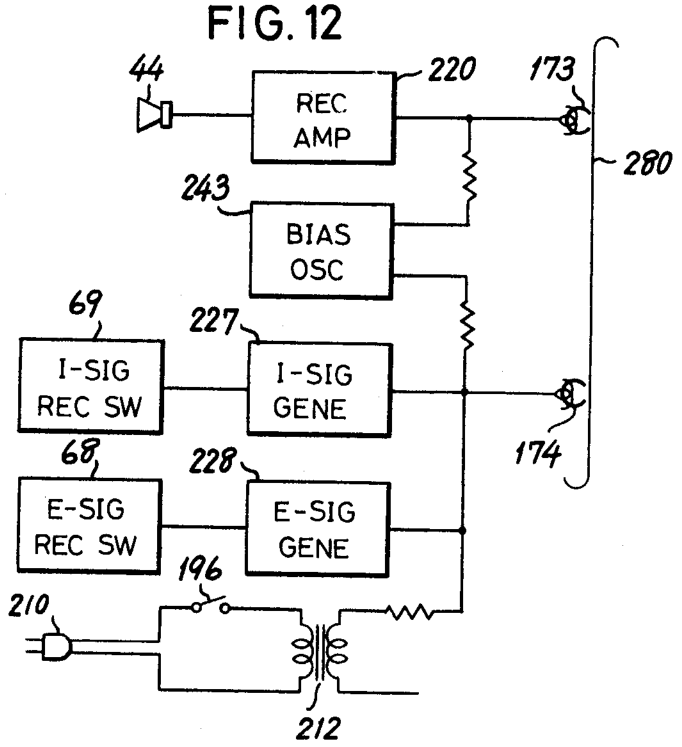
FIG. 12 is a block diagram of one embodiment of an electrical circuit of the audio signal and control signal recording section of the dictator.

FIG. 12 shows roughly in a block system the extracted circuit indicated in FIG. 7 of each of the respective signals to be recorded. Parts identical to those in FIG. 7 are designated by like reference numerals and their detailed description is omitted. In the control signals, the frequency of the T-signal is established as being equal to the frequency of the power supply, and the frequencies of the E-signal 282 and the I-signal 283, respectively, are multiples of the frequency of the T-signal 281. For example, when the frequency of the power supply is 60 Hz, and it is elected to make the frequency of the other respective signals 8 times (3 octave).

Here, T-signal 281 = 60 Hz

E-signal = 60 × 8 = 480 Hz

I-signal = 480 × 8 = 3,840 Hz

Since the frequency of the T-signal is established as a low frequency of the power supply frequency, any crosstalk as may arise at the time of message playback would not in general become of noticeable volume, wherefore the use of an oscillator would not be needed at the time of recording. Insofar as the E-signal and I-signal are concerned, their time of recording is extremely short, wherefore there would be no inconvenience even if crosstalk should be generated at the time of playback.

Figure 13:
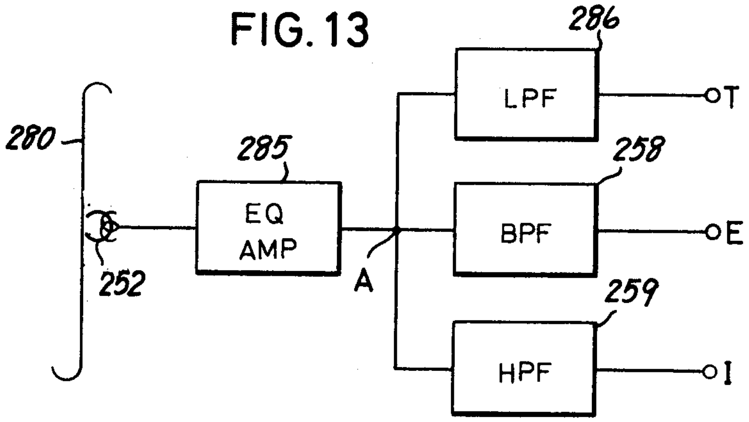
FIG. 13 is a block diagram of one embodiment of a control signal discriminating circuit of the transcriber.
Figure 14:
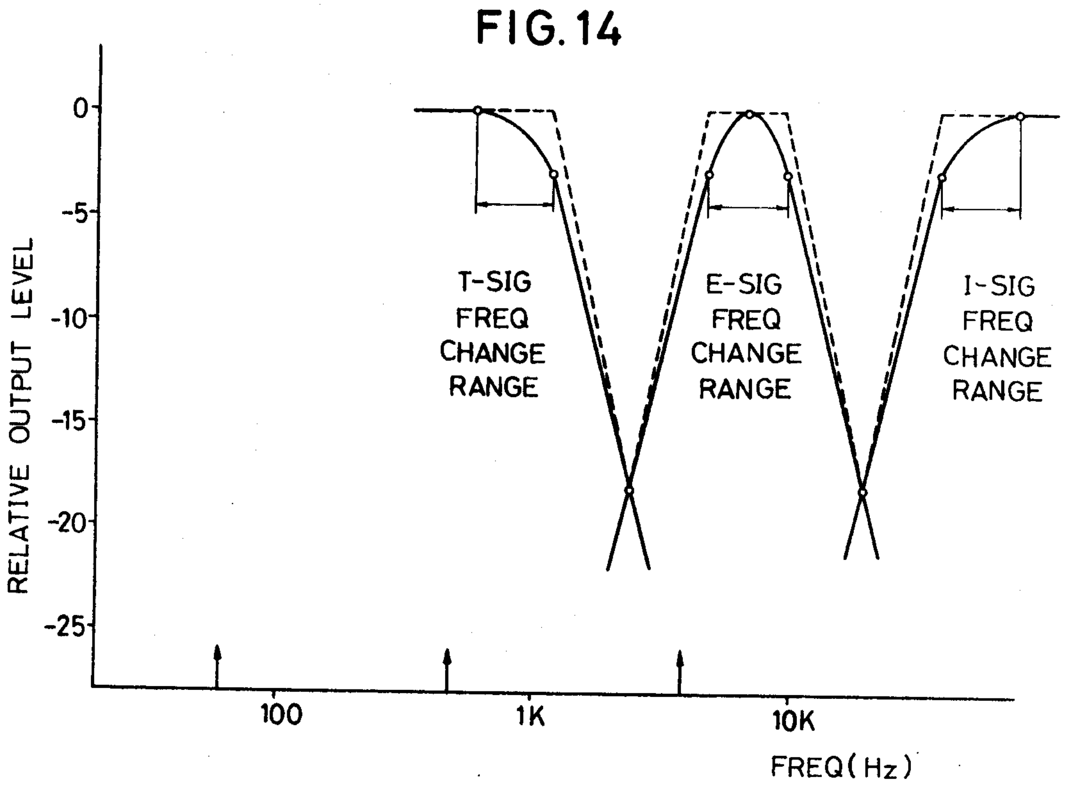
FIG. 14 is a graph indicating the frequency characteristic of one example of a filter applied to the control signal discriminating circuit illustrated in FIG. 13.

A description will now be given on the discrimination of the time of playback of the T-signal 281, E-signal 282 and I-signal 283 as recorded in accordance with the above approach. FIG. 13 is a general presentation of the block system in the discrimination circuit extracted from the circuit shown in FIG. 10 and embodied in the transcriber 41. The control signal recorded on the magnetic tape 280 is supplied to an equalizing amplifier 285 after having been reproduced by the reproducing head 252. If at this point, the attenuation characteristic of the equalizing amplifier 285 is set at 6 dB/oct, it will be possible by appropriate setting of the recording level of the control signal in relation to the magnetic tape 280 to establish 9 constant output level at the point A corresponding to the output side of the equalizing amplifier 285 in respect to T-signal 281, E-signal 282 and I-signal 283. At the point A are connected respectively a low-pass filter 286, band-pass filter 258 and a high-pass filter 259. FIG. 14 depicts the frequency characteristic of each of the filters 286, 258 and 259.

The detection of the control signals at the time of high speed take-up winding and rewinding in the transcriber 41 will now be described. In the operations which take place in the transcriber 41, the travelling speed of the magnetic tape 280 varies in speed ranging from 10 to 20 times that of the speed in recording in the dictator 40 because of the variation in the radius of the wound tape formed on the take-up reel. Consequently, the reproducing frequency of each of the control signals resulting in the above operation also varies in the same range depending upon the point of recording on the magnetic tape. Therefore, the control signals will be reproduced within the frequency ranges as follows: T-signal 281 600 – 1,200 Hz; E-signal 282 4.8 KHz – 9.6 KHz; and I-signal 282 38.4 KHz – 76.8 KHz. However, in consideration of the variation of the load on the tape during playback, it is necessary to give a little more percentage leeway in the above range limits. When the control signals converted in frequency as mentioned above as supplied to filter 286, 258, 259 having frequency characteristics as shown in FIG. 14, the difference in the output level between the maximum frequency of 1.2 KHz for the T-signal 281 and the lowest frequency of 4.8 KHz for the E-signal 281 will be over 30 dB, wherefore, and since the output signal from the low-pass filter 286 will be restricted by the T-signal 281, the discrimination of the T-signal would be effected. The E-signal 282 and the I-signal 283 are likewise discriminated, wherefore the relative description will be omitted. In the foregoing illustration, the spacing of the frequency for each of the signals is set at 3 octaves, and filter each having a frequency characteristic of 18 dB/oct are used. However, it is understood that the spacing of the frequency of each signal as well the frequency characteristic of the filter can be selected at will as long as are satisfied the following two conditions: that the discrimination of the T-, E- and I-signals 281 – 283 at the time of high-speed travel of the magnetic tape is exact and without any erroneous control, and that the attenuation in the output power or output power variation occure in the high frequency detection (especially I-signal 283) due to a dirty head face of the reproducing head 252 and no faulty control is induced.

Figure 15:
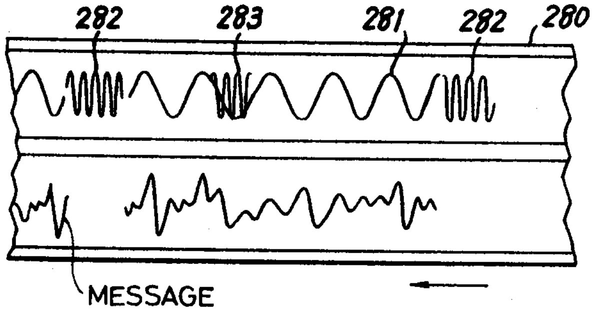
FIG. 15 and 16 are track pattern diagrams respectively indicating other modes of recording control signals and message signals on the magnetic tape by a dictator.
Figure 16:
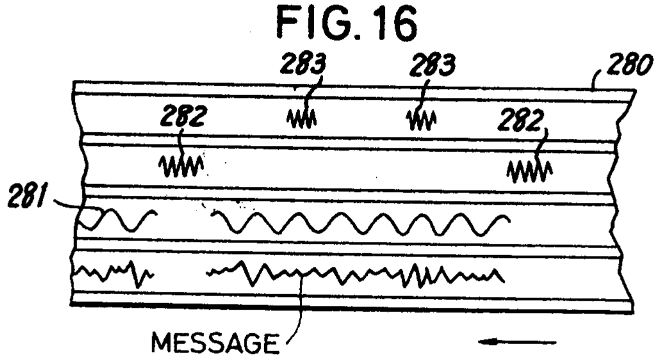

In the magnetic tape 280 described above, the method of dividing the magnetic tape into 4 tracks as is generally practised in stereo tape recorders and using two tracks on the one side was described. However, it is obvious that the magnetic tape 280 can be divided into two tracks as shown in FIG. 15 or can be split up into 4 tracks as shown in FIG. 16 with the message signal, T-signal, E-signal and I-signal recorded separately on the tracks.

Another method of the recording of the T-signal, E-signal and I-signal and their discrimination is described in the second embodiment. in this embodiment, the object proposed is a method of eliminating the band-pass filter from the control signal discriminating circuit and converting the high frequency control signal (I-signal) to a much lower frequency signal. In satisfying this objective, the following point are considered.

1. There is no need for discriminating only the recorded T-signal recorded simultaneously with the message recording.

2. Since the E-signal and I-signal are each used for different objectives, there two kinds of signals must be completely separated.

With consideration of the above noted two points, the signals are divided into two series of frequencies as shown hereunder and recorded as control signals with difference in the recording level.

a. T-signal: electric power source frequency (for example, 60 Hz)

b. I-signal: electric power source frequency (for example, 60 Hz)

c. E-signal: a multiple of the T-signal frequency (for example 60 × 10 = 600 Hz)

d. I-signal recording level greater than T-signal recording level. In the foregoing, the T-signal frequency is made equal to the I-signal frequency but the T-signal frequency can also be made equal to the E-signal frequency. In respect to (d), if the T-signal recording level is set from the peak to −20 dB and the I-signal recording level set at −5 dB, there is a reproduction level difference of 15 dB between the T-signal and I-signal wherefrom, it can be concluded that there is an ample level difference in separating the T-signal and I-signal.

FIG. 17 shows the recorded state of the control signal and the message signal of the above organization in respect to the magnetic tape. FIG. 18 indicates the block circuit diagram of the recording circuit, and parts identical to those in FIG. 11 and FIG. 12 are identified by like reference numerals. In FIG. 17, the I-signal 283 and T-signal 281 are selected at the same frequency, wherefore in FIG. 18 the recording of the I-signal does not require the use of an oscillator, but use is made of an I-signal circuit 292. The organization of the I-signal circuit 292 is shown in FIG. 19.

When the I-signal switch 69 as shown in the drawing is in an open state, the current from the power source +B flows to the base of the transistors $Tr_{12}$ and $Tr_{17}$ and not to the base of transistor $Tr_{10}$. As a consequence, the transistor $Tr_{17}$ in an attenuation circuit 293 turns in an on state and the control signal recording head 174 records the power source frequency signal (the T-signal) at an attenuated level. And when the I-signal recording switch 69 in closed, the base current of transistor $Tr_{17}$ is cut off for the time determined by the charging time constant of the capacitor $C_8$ whereat, the transistor $Tr_{17}$ goes off and the attenuation circuit 293 becomes inoperative. Therefore the I-signal recording switch 69 is closed, the signal recording head 174 records the power source frequency signal (I-signal) for a predetermined period of time at an unattenuated level.

Figure 20:
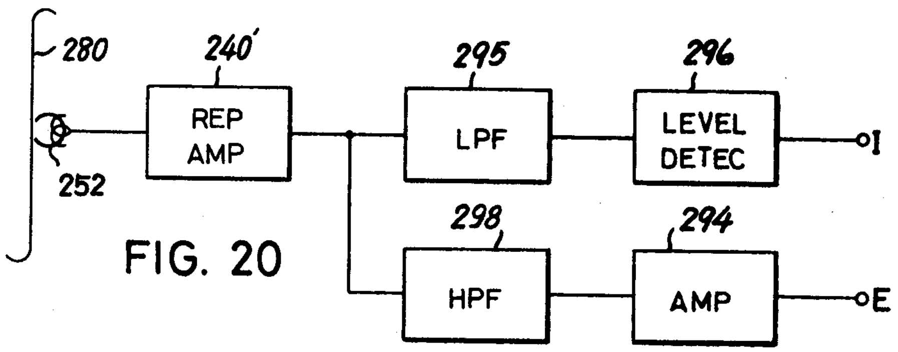
FIG. 20 is a block diagram of an electrical circuit for discriminating control signals and message signals indicated in FIG. 17.

FIG. 20 shows a block diagram of the circuit for discriminating the control signal recorded pursuant to the method of signal recording given in the preceding. In FIG. 10, identical parts are shown by identical code number. The T-, E- and I- control signal recorded on the magnetic tape 280 are reproduced by the control signal reproducing head 252 and after being amplified by the repeoducing amplifier 240', supplied to the low-pass filter 295 and to the high-pass filter 298. The E-signal in the control signal is filtered out by the high-pass 298 and after amplification by the amplifier 294, the E-signal is supplied to the following stage circuit. On the other hand, the low frequency T- and I-signals pass through the low-pass filter 295 and the high recording level I-signal is taken out by a level detector 296 constituted by the Schmidt-trigger circuit.

Also, in place of the above embodiment, it will be understood that the T- and E- signals indicating the message recording zone can be set at the electric power source frequency, frequency of the I-signal set at a value several times that of the power source frequency and further, setting the recording level of the T-signal at a level lower than that of the E-signal.

THE RECORDING METHOD AND RECORDING CIRCUIT FOR THE T-SIGNAL

Figure 21:
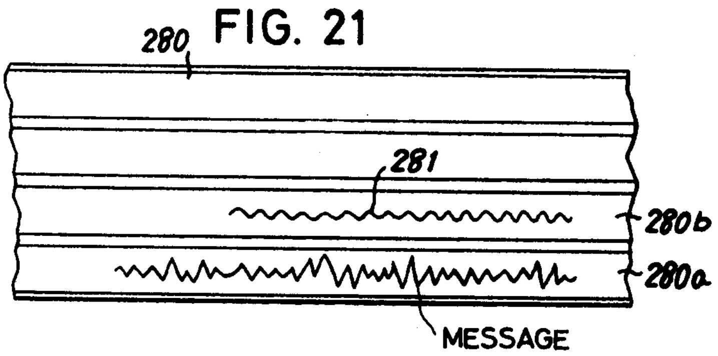
FIGS. 21 and 22 are track pattern diagrams respectively indicating modes of delay recording of T signals with respect to message signals and E signals.
Figure 22:
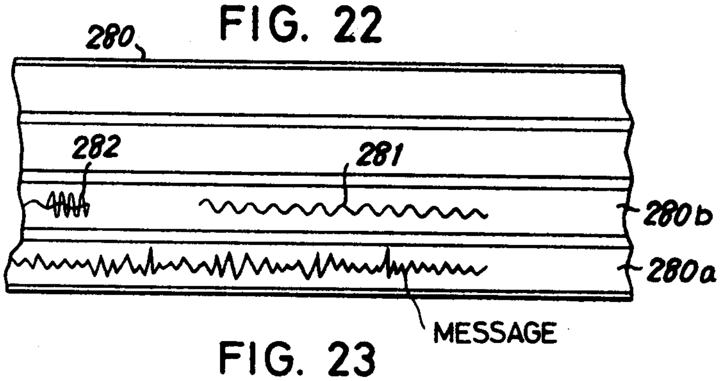

As long as the message recording continues on the message signal recording track 280*a* in the above given recorder, T-signal 281 continues to be recorded on the control signal recording track 280*b*. However, in the event that the E-signal 281 is recorded or another separate message is recorded at the beginning of message recording or in the course of message message recording, the T-signal 281 as shown in FIG. 21 and FIG. 22 will be recorded after a certain delay in time. This is necessary for correction of the slight overshooting beyond the desired point at which the magnetic tape will come to a stop because of the mechanical inertia of the take up mechanism when the magnetic tape 280 is rewound at high speed and the apparatus is automatically brought into a stop at a point where there is no recording of the T-signal 281.

Figure 23:
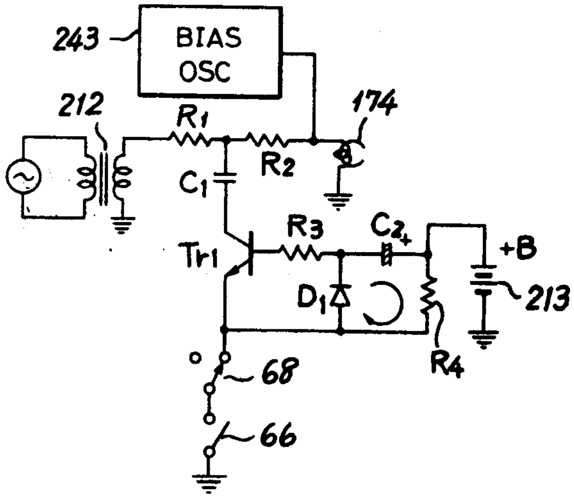
FIG. 23 is a circuit diagram of one embodiment of a T-signal delay recording signal for recording by dealying T signals as indicated in FIGS. 21 and 22.

FIG. 23 shows an embodiment of the circuit for recording the T-signal after a certain delay of time. In the FIG. 23, parts identical to those in FIG. 7 are denoted by the pane reference numerals. The signal recording head 174 is connected to the output terminal of a transformer 212 through the output terminal of a bias oscillator 243 and resistors $R_1$ and $R_2$. The collector side of the transistor $Tr_1$ for switching is connected to the connecting point of the resistors $R_1$ and $R_2$ through a capacitor $C_1$ and a normally closed E signal recording switch 68 and a normally closed recording switch (terminal D in the four-position control switch 66 shown in FIG. 7) connected in series to the emitter side of transistor $Tr_1$. The other terminal of recording switch 66 is grounded. The base of the transistor $Tr_1$is connected to the resistor $R_3$ and capacitor $C_2$ in series and the other terminal of the capacitor $C_2$ connected to a +B of the DC power source 213. Further, the resistor $R_4$ connected in series and a diode $D_1$ is connected in parallel between the end terminals of the capacitor $C_2$ thereby forming a closed loop.

By closing the recording switch 66 and converting the dictator 40 to the mode of "record" from the "stop" mode, the emitter side of the transistor $Tr_1$ becomes grounded because of the closed state of the E-signal recording switch 68, as a consequence, and since the base of the transistor $Tr_1$ is applied with the +B voltage of the DC power source circuit 213 via the capacitor $C_2$ and resistor $R_3$, the signal recording head 174 is maintained in a non-working state because of the connection between the collector and the emitter. At this point, as the capacitor is charged and the charged voltage reaches the +B voltage, the current to the base of the transistor $Tr_1$ is cut off, the transistor $Tr_1$ is brought into an off state and the recording of the signal of the power frequency (T-signal 281) by means of the signal recording head 174 commences.

Furthermore, in the event of recording an E-signal between one message and another message during the message recording, this is executed by opening the E-signal recording switch 68 and leaving the recording switch 66 closed. In this way, the emitter side of transistor $Tr_1$ becomes open and the electrical charge of capacitor $C_2$ is discharged by the closed circuit formed by the resistor $R_4$ and diode $D_1$. Moreover, since the diode $D_1$ is connected in the forward direction, the discharging time constant will be a function of the values of the resistor $R_4$ and capacitor $C_2$ and for all practical purposes, these values can be set relatively low. For example, if we take the value of capacitor $C_2 = 100\ \mu F$, resistor $R_4 = 1\ K\Omega$, the discharging time constant would be 0.1 seconds. Consequently, if the E-signal recording switch 68 is closed upon the completion of the recording of the E-signal 282, the current from the DC power source circuit 213 would flow to the base of the transistor $Tr_1$ via the capacitor $C_2$ and resistor $R_3$ similarly as in the case of recording and therefore placing the transistor $Tr_1$ in open state. At this time, the recording of the T-signal 281 is not executed immediately, but after the capacitor $C_2$ is charged-up and applying of the current to the base of the transistor $Tr_1$ is ceased whereby the transistor $Tr_1$ is turned into an off state, the recording of the T-signal is again started.

It will be understood for those skilled in the art that the delay time from the beginning of the recording of the message to the beginning of therrecording of the T-signal and the delay time from the ending of the recording of the E-signal to the beginning of the recording of the T-signal may be appropriately changed by selecting and using the capacitor $C_2$ having different characteristics.

AUTOMATIC STOPPING CIRCUIT ACTUATED BY NON-DETECTION OF T-SIGNAL

Figure 24:
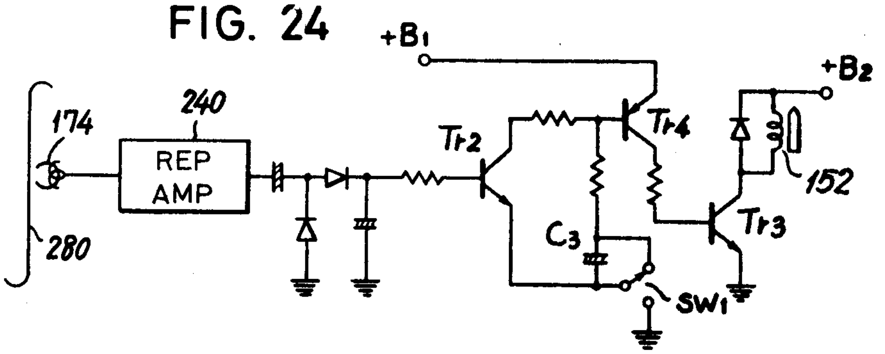
FIG. 24 is a circuit diagram of one embodiment of an automatic stopping circuit used in a transcriber operating upon detecting non-reproducing of a T signal.

In carrying out the fast-forward feeding of the magnetic tape by operation of the manual control unit 42, the magnetic tape continues to make the fast running while the recording and reproducing head 174 detects and reproduces the T-signal from the control signal track of the magnetic tape, and the recorder 40 is changed to a stop mode immediately when the head 174 has ceased to detect the T-signal. An automatic stopping circuit which is adapted to perform this operation will now be described. FIG. 24 is a circuit diagram of a fast-forward control circuit 238 (FIG. 7).

$Tr_2$ and $Tr_3$ are respectively NPN transistors and $Tr_4$ is a PNP transistor. An electric current from a power source $+B_1$ is applied to the emitter of the transistor $Tr_4$ and an electric current from a power source $+B_2$ is applied to a fast forward solenoid 152 and a diode $D_2$. If the T-signal is recorded on the portion of a magnetic tape 280 with which the head 174 is in engagement, the T-signal reproduced by the head 174 is amplified in the reproducing amplifier 240 and thereafter is converted to a direct current through a rectification circuit of a known type consisting of a diode and a capacitor and applied to the base of the transistor $Tr_2$.

The operation of the automatic stopping circuit of the above described construction will now be described.

As the movable contact of the switch $SW_1$ is changed over to the ground side (this corresponds to the setting of the fast-forward mode of the dictator 40 by changing over of the control switch 66 of the manual control unit 42 to the neutral position N and operating the fast-forward switch 67.), the transistor $Tr_4$ becomes conductive because the charging current of a capacitor $C_3$ flows. The voltage from the power source $+B_1$ is applied to the base of the transistor $Tr_3$ thereby bringing the transistor $Tr_3$ into conduction. This actuates the fast-forward solenoid 152 to run the magnetic tape 280 at a high speed in a forward direction. The PNP transistor $Tr_4$ becomes non-conductive when the capacitor $C_3$ has been fully charged. If, however, the T-signal is being reproduced from the control signal recording track of the magnetic tape 280 by the head 174, the T-signal is converted to a direct current through the reproducing amplifier 240 and a rectification circuit and applied to the base of the transistor $Tr_2$. The transistor $Tr_2$ therefore conducts and maintains the conductive state of the transistor $Tr_4$. Accordingly, the solenoid 152 remains operative while the T-signal is detected by the head 174 from the running magnetic tape 280.

When the head 174 has ceased to reproduce the T-signal from the magnetic tape 280, the transistor $Tr_2$ instantly becomes non-conductive. Since the capacitor $C_3$ is in a saturated condition, the PNP transistor $Tr_4$ also becomes non-conductive. Accordingly, the transistor $Tr_3$ becomes non-conductive and the solenoid 152 which has no supply of electric current now returns to a non-operative state thereby stopping the running of the tape. Thus, cease of detection of the T-signal by the head 174 immediately brings the fast-forward solenoid 152 into a non-operative state thereby holding the excessive feeding of the magnetic tape at a minimum and stopping the running of the magnetic tape.

Figure 25:
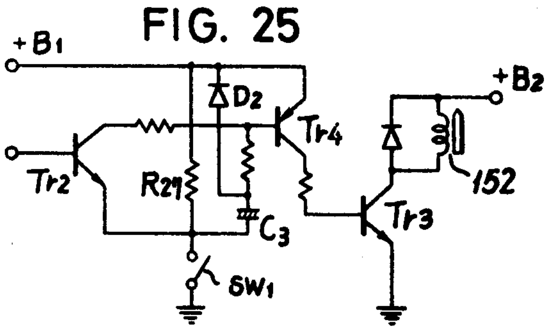
FIG. 25 is a circuit diagram of another embodiment of the above mentioned automatic stopping circuit.

FIG. 25 is a circuit diagram of another embodiment of the automatic stopping circuit in which the same component parts as in FIG. 24 are designated by the same reference numerals. In this circuit, discharge of the capacitor $C_3$ is automatically made by a closed loop consisting of a diode $D_2$ and a resistor $R_{27}$ after a switch $SW_1$ is closed. Description of the construction and operation of this circuit in other respects will be omitted.

AUTOMATIC STOPPING CIRCUIT ACTUATED BY DETECTION OF E-SIGNAL

Figure 26:
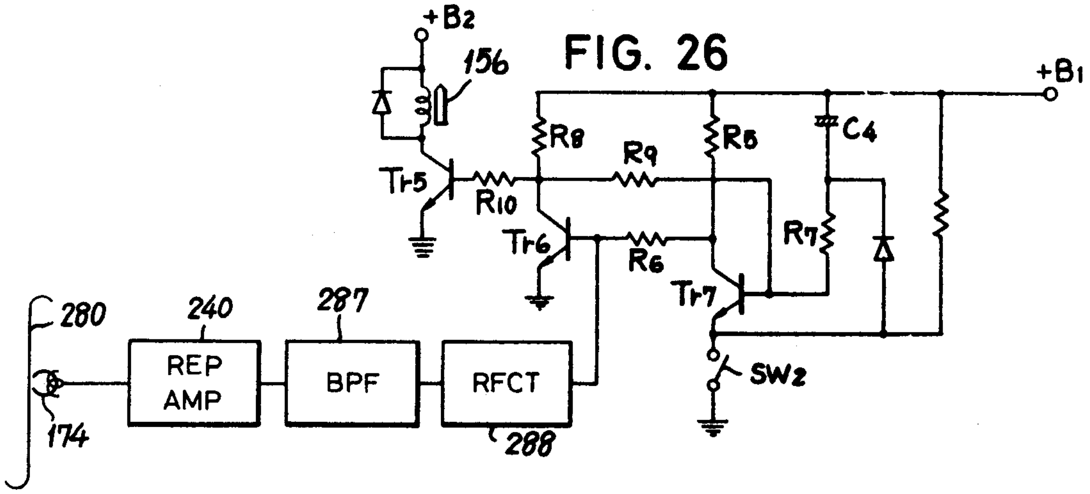
FIG. 26 is a circuit deagram of one embodiment of an automatic stopping circuit used in the transcriber shown in FIG. 3 and operating upon detecting an E signal.

The automatic stopping circuit has a function of changing the dictator 40 from the rewinding mode to the stop mode when the head 174 has detected and reproduced the E-signal from the magnetic tape 280. The construction and operation of this circuit will be described hereinbelow with reference to FIG. 26. In the figure, the same component parts as in FIG. 7 are designated by the same reference numerals.

While a switch $SW_2$ corresponding to the control switch 66 of the manual control unit 42 is open, a transistor $Tr_7$ is not in conduction because its emitter side is open, whereas a transistor $Tr_6$ with its emitter grounded is in a conductive state because a voltage from a power source $+B_1$ is applied to the base thereof through resistors $R_5$ and $R_6$. Accordingly, no electric current is supplied to the base of a transistor $Tr_5$ which therefore is not in conduction.

The plunger 156 is therefore in a non-operative state.

When the switch $SW_2$ is closed (i.e., the control switch 66 is changed over to the rewind BS position), the emitter of the transistor $Tr_7$ is grounded, and the transistor $Tr_7$ to which voltage has been applied from a capacitor $C_4$ and from the power source $+B_1$ through a resistor $R_7$ becomes conductive. On the other hand, the flow of the base current to the transistor $Tr_6$ is stopped and, accordingly, the transistor $Tr_6$ becomes non-conductive. Even when the capacitor $C_4$ is fully charged, the transistor $Tr_7$ remains in a conductive state because current continues to be supplied to the base thereof through resistors $R_8$ and $R_9$. At this time, current from the power source $+B_1$ is supplied to the base of the transistor $Tr_5$ through resistors $R_8$ and $R_{10}$ bringing it into conduction and thereby actuating the rewind solenoid 156 by the current from the power source $+B_2$. This actuates the rewinding mechanism of the apparatus to drive the magnetic tape 280 at a high speed in a reverse direction.

When the head 174 which is in contact with the control signal recording track of the magnetic tape 280 and is detecting and reproducing the E-signal, the E-signal is applied to the base of the transistor $Tr_6$ through the reproducing amplifier 240, E-signal discriminating circuit 287 and the E-signal rectifying circuit 288. This bring the transistor $Tr_6$ into conduction and the transistors $Tr_5$ into a non-conductive state. The rewind solenoid 156 is brought into a non-operative state thereby stopping the rewinding of the magnetic tape 280.

The closing of the switch $SW_2$ corresponds to the manual switching of the control switch 66 to the rewind BS position against the force of the spring (not shown). When the operator has confirmed the temporary stopping of the magnetic tape and thereupon released the control switch 66, the movable contact of the control switch 66 is disconnected from the rewind BS contact point and the switch $SW_2$ is opened thereby briging the solenoid 156 into a non-operative state. Accordingly, the inventive device is capable of changing the magnetic tape drive means to a non-operative state immediately upon detection of a predetermined signal from the running magnetic tape. The device is particularly useful in an apparatus in which the setting of the starting point of the magnetic tape is made by detecting a part of the tape on which a predetermined signal is recorded.

E-SIGNAL AND I-SIGNAL RECORDING CIRCUIT

Figure 27:
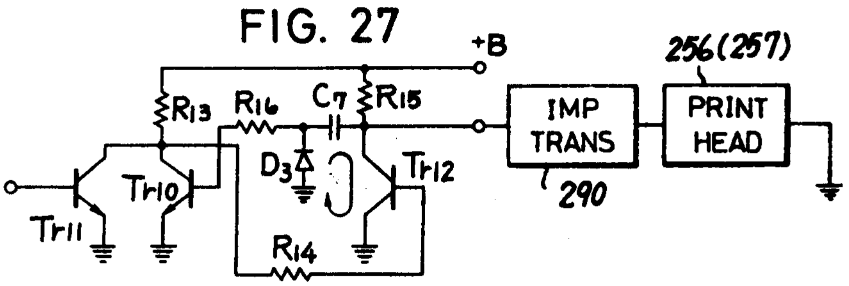
FIG. 27 is a circuit diagram of one embodiment of a one-shot multivibrator circuit used in an E-signal (and I-signal) printing circuit of the transcriber.

The circuit shown in FIG. 27 is adapted for use in the E and I-signal printing circuit of the transcriber 41. This circuit is so constructed that an E-signal printing head 256 (an I-signal printing head 257) is actuated for a predetermined period of time irrespective of the length of time during which a signal is applied to the base of a transistor $Tr_{11}$. Since the current flowing from a power source +B to the base of a transistor $Tr_{10}$ is normally interrupted by a capacitor $C_7$ in charged condition, the transistor $Tr_{10}$ is not in conduction. In the meanwhile, a transistor $Tr_{12}$ is in conduction because current is supplied to the base thereof through resistor $R_{13}$ and $R_{14}$. Accordingly, the output thereof to the input side of an impedance transformer 290 is zero. Since in this mode the transistor $Tr_{12}$ is in conduction and a diode $D_3$ is connected in a forward direction, a closed loop is formed and the capacitor $C_7$ discharges along this closed loop. Accordingly, voltage across the capacitor $C_7$ becomes zero.

In the above described mode, the E-signal (or I-signal) detected and reproduced from the magnetic tape by the reproducing head is converted to a pulse signal and applied to the base of the transistor $Tr_{11}$. The transistor $Tr_{11}$ conducts and the collector voltage of the transistor $Tr_{10}$ becomes zero. This brings the transistor $Tr_{12}$ into non-conduction. The base current is supplied from the power source +B to the base of the transistor $Tr_{10}$ through the resistor $R_{15}$, capacitor $C_7$ and the resistor $R_{16}$ bringing the transistor $Tr_{10}$ into conduction. If the value of resistance of the resistor $R_{15}$ is selected at a sufficiently smaller value than that of the resistor $R_{16}$, the voltage drop in the base current of the transistor $Tr_{10}$ across the resistor $R_{15}$ can be disregarded. Accordingly, a DC voltage which is substantially equal to the voltage of the power source +B is developed at the input of the impedance transformer 290 and the E-signal printing head 256 (the I-signal printing head 257) is actuated.

When the capacitor $C_7$ is charged nearly to the voltage of the power source +B, the transistor $Tr_{10}$ is cut off and the transistor $Tr_{12}$ conducts again. Accordingly, the voltage at the input of the impedance transformer 290 drops to zero thereby returning the E-signal printing head 256 (the I-signal printing head 257) to a non-operative state. At this time, the capacitor $C_7$ discharges along the closed loop and the one-shot multivibrator is brought into a state in which it is prepared to receive the E-signal in the form of a pulse applied to the base of the transistor $Tr_{11}$.

As described in the foregoing, the E-signal printing head 256 (I-signal head 257) becomes operative each time the pulse signal is applied to the base of the transistor $Tr_{11}$. The operating time of the printing head 256 (257) is the time during which the transistor $Tr_{10}$, is in conduction, i.e., a constant length of time determined by the charging time constant of the resistor $R_{16}$ and the capacitor $C_7$. Since a voltage of the same polarity is always applied to the capacitor $C_7$, a polarized capacitor such, for example, as a chemical capacitor may be used. This enables the printing head 256 (257) to operate for several seconds.

Figure 28:
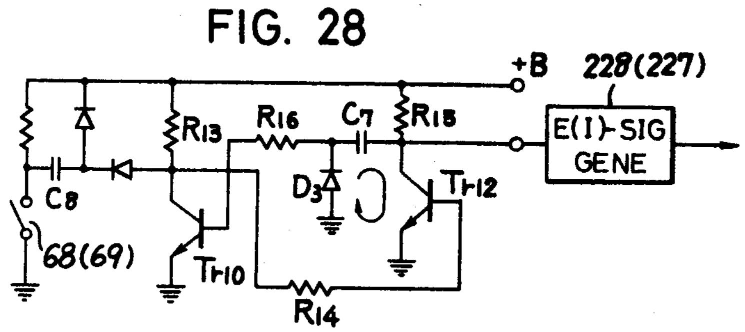
FIG. 28 is a circuit diagram of one embodiment of one-shot multivibrator circuit used in an E-signal (and I-signal) printing circuit of the dictator.

FIG. 28 is a circuit diagram showing an E-signal and I-signal recording circuit incorporating the above described one-shot multivibrator. In the figure, the same component parts as those shown in FIG. 27 are denoted by the same reference characters. When the E-signal recording switch 68 (I-signal recording switch 69) is depressed, the E-signal generating circuit 228 (I-signal generating circuit 227) receives a DC output during a constant period of time which is determined, as in the circuit shown in FIG. 27, by a charging time constant of a resistor $R_{16}$ and a capacitor $C_7$, thereby operating the E-signal generating circuit 228 (I-signal generating circuit 227) during this constant period of time. If the signal recording switch 68 (69) is depressed for any extended period of time, no constant direct current flows due to the capacitor $C_8$, so that a signal of a brief period of time is applied to the point G and the E-signal (I-signal) generating circuit 228(227) operates during the constant period of time even if the switch 68 (69) is kept closed.

AUTOMATIC STOPPING CIRCUIT WITH A PROTECTION CIRCUIT

Figure 29:
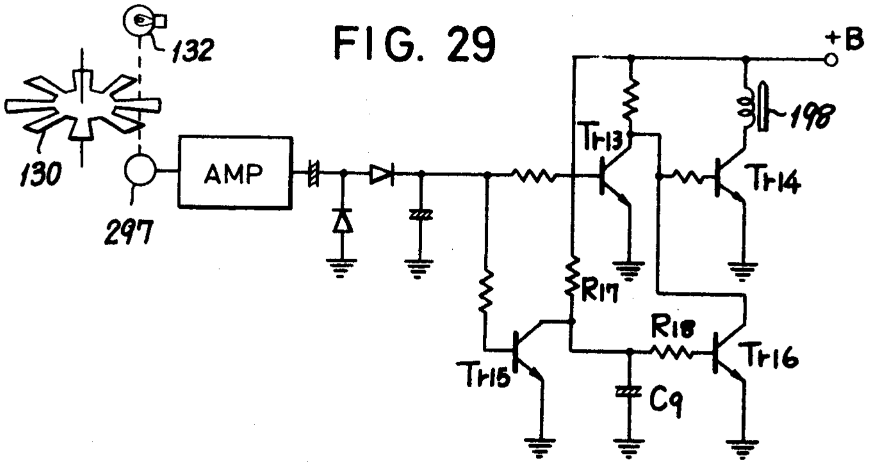
FIG. 29 is a circuit diagram of one embodiment of an automatic stopping circuit provided with a protection circuit and used in the dictator and transcriber.

This is a circuit provided for bringing the magnetic tape running mechanism into a stop mode automatically when the magnetic tape in the cartridge has been fed to its terminating and either in a forward or a reverse direction. This circuit will be described in conjunction with FIG. 29. This circuit is denoted by reference numeral 242 in FIG. 27 and reference numeral 268 in FIG. 10, and the same component parts as those of the dictator 40 are designated by the same reference numeral.

In the figure, the vane wheel 130 is connected by means of the belt 131 to the pulley 123 secured to the lower surface of the supply reel support 124 as shown in FIG. 6, and is rotated by the reel support 124 through the pulley and the belt 131 as the reel support 124 is rotated by the running magnetic tape in the cartridge 45. The rotating vanes of the vane wheel 130 intermittently shield the light projected from a lamp 132 to a photo-sensitive element 297 such as CdS, thereby generating a rotation signal in accordance with the rotation of the vane wheel 130.

When the dictator 40 is in a stop mode, the photosensitive element 297 produces no rotation signal. Transistors $Tr_{13}$ and $Tr_{15}$ which receive no rotation signal at their respective bases are not in conduction. On the other hand, a transistor $Tr_{16}$ is in conduction because voltage from the power source +B is applied to the base of the transistor $Tr_{16}$ through resistors $R_{17}$ and $R_{18}$. A transistor $Tr_{14}$ is not in conduction because the conduction of the transistor $Tr_{16}$ cuts off the base current to the transistor $Tr_{14}$. A release solenoid 198 therefore is in a non-operative state.

As the magnetic tape in the cartridge 45 starts to run and the vane wheel 130 starts to rotate, the rotation signal is generated from the photo-sensitive element 297. The rotation signal is supplied through an amplifier and a peak detection circuit to the bases of the transistors $Tr_{13}$ and $Tr_{15}$ thereby bringing these transistors into conduction. This causes a capacitor $C_9$ to discharge through the transistor $Tr_{15}$. The base potential of the transistor $Tr_{16}$ now becomes zero and the transistor $Tr_{16}$ is cut off. The base potential of the transistor $Tr_{14}$ is still zero because the transistor $Tr_{13}$ conducts though the transistor $Tr_{16}$ is cut off. The transistor $Tr_{14}$ therefore remains in a cut-off state.

As the magnetic tapes is fed in a forward or reverse direction to its terminal end, the rotation of the vane wheel 130 is stopped and the photo-sensitive element 297 ceases to produce the rotation signal. The transistors $Tr_{13}$ and $Tr_{15}$ become non-conductive and, accordingly, the current from the power source +B is supplied to the bases of the transistors $Tr_{14}$ and $Tr_{16}$. However, the transistor $Tr_{16}$ which is connected to the capacitor $C_9$ does not immediately conduct, and the transistor $Tr_{14}$ only conducts. This actuates the release solenoid 198 to move the locking cam 192 to the non-operative position thereby to release the operation key which has been locked in the locking position of the locking cam 192. Thus, the dictator 40 is brought into a stop mode. When the charged voltage of the capacitor $C_9$ has reached a predetermined value, the transistor $Tr_{16}$ becomes conductive and causes the base current of the transistor $Tr_{14}$ to be cut off. As the transistor $Tr_{14}$ is cut off, the release solenoid 198 becomes non-operative thereby bringing the automatic stopping circuit to the original state. Hence, no electric current continues to flow to the release solenoid 198 so that the release solenoid is protected from burning. The automatic stopping circuit of the transcriber 41 has the same construction and operates in the same manner as the above described circuit so that description thereof will be omitted.

ALARMING DEVICE AND CIRCUIT

An alarming device is provided for generating an alarming sound and thereby giving warning to the operator in the following instances:

1. The dictator 40 is brought into a recording mode with the cartridge 45 being loaded without its lug **45*a* or without loading the cartridge 45.**
2. The magnetic tape in the cartridge 45 loaded in the dictator 40 has been fed in a forward direction nearly to its terminal end.
3. The operation key is depressed in a state in which the four-position control switch 66 of the manual control unit 42 is connected to a position other than the neutral position N.

Figure 30:
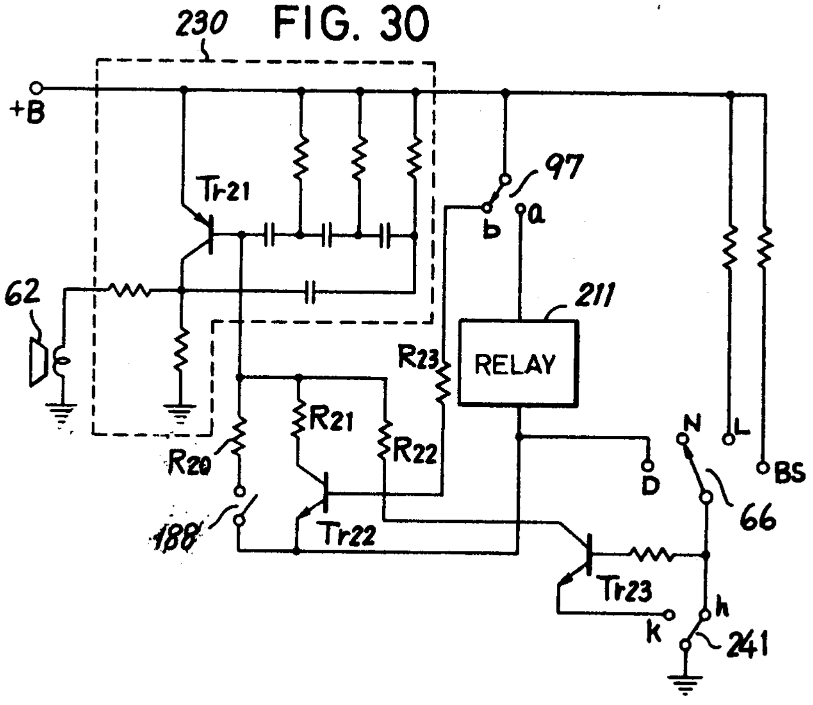
FIG. 30 is a circuit diagram of one embodiment of an alarm circuit used in the dictator.

FIG. 30 illustrates a concrete example of the alarming circuit adapted for use in the dictator 40. The speaker 62 which sounds an alarming sound is connected to the collector of a PNP transistor $Tr_{21}$ provided in the alarm generating circuit 230. The transistor $Tr_{21}$ is connected at the base thereof to a switch 188 for the time dial and the collectors of transistors $Tr_{22}$ and $Tr_{23}$ which constitute an AND circuit through resistors $R_{20}$, $R_{21}$ and $R_{22}$ respectively. The transistor $Tr_{22}$ is connected at the base thereof to the contact point *b* of the recording preventing switch 97 through a resistor $R_{23}$. The switch 188 for the time dial and the emitter of the transistor $Tr_{22}$ are respectively connected to the relay 211 and the record terminal D of the control switch 66.

Figure 31:
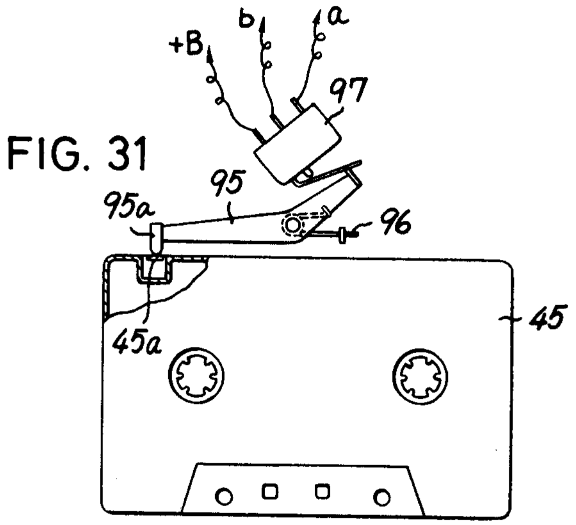
FIG. 31 is a simplified plan view, with a part cut away, indicating the relationship between a contact part of a cartridge and a switch for preventing misrecording.

Assuming that the above described case (1) has occured, the operation of the above described alarming circuit will be described with reference also to FIG. 31. If the cartridge 45 is loaded in the predetermined position without the lug **45*a* or if the cartridge 45 is not loaded at all, the recording prevention lever 95 is in counter-clockwise pivoted position due to the force of the torsion spring 96 because the projection 95*a* provided at foremost end thereof is not engaged with the lug 45*a* of the cartridge 45. Accordingly, the recording preventing switch 97** remains connected to the contact point *b* and the relay 211 is not actuated even if the four-position control switch 66 is changed over to the record position D. The dictator 40 therefore is not changed to a record mode. At this time, the transistor $Tr_{22}$ is grounded at the emitter thereof through the control switch 66 which is now connected to the record position D and the control changeover switch 241. The voltage from the power source +B is being applied to the base of the transistor $Tr_{22}$ through the recording preventing switch 97 which is connected to the contact point *b* and the resistor $R_{23}$. Accordingly, the transsitor $Tr_{22}$ is conducting, and current is supplied to the base of the transistor $Tr_{21}$ bringing the same into conduction. This actuates the alarm generating circuit 230 to sound the alarm from the speaker 62.

Figure 32:
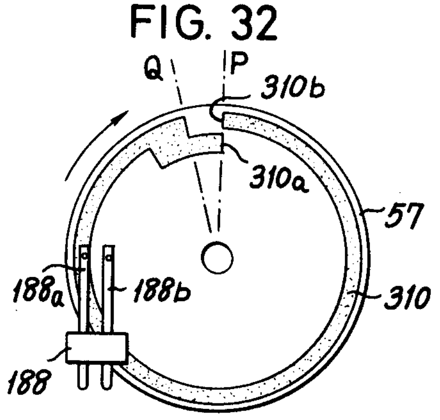
FIGS. 32 and 33 are respectively a rear view and a side view indicating the relationship between a time dial and a dial switch.
Figure 33:
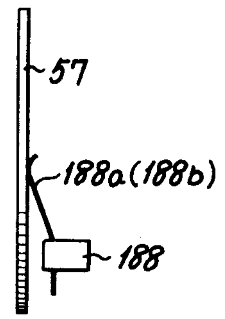

Referring to FIG. 32 and 33, operation of the alarming circuit when the above described case (2) has occurred will be described. FIG. 32 illustrates the rear side of the time dial 57. The time dial 57 is so constructed that it will rotate in a clockwise direction as viewed in the figure as the magnetic tape in the cartridge 45 runs in a forward direction. A printing circuit 310 is provided substantially around the outer peripheral portion of the time dial 57. The switch 188 for the time dial is provided in the vicinity of the circuit 310 with one of its two contacts (a contact **188*a* in the illustrated example) being in contact with the printing circuit 310. The end portion 310*a* of the printing circuit 310 is made wider than the other portion of the same circuit to enable the two contacts 188*a* and 188*b* to make contact with the printing circuit 310 at the same time for closing the switch 188.**

In the recording mode of the dictator 40, the time dial 57 is rotated clockwise (counterclockwise in FIG. 5) in accordance with the running of the magnetic tape in a forward direction. As a position P indicating the fact that the winding of the magnetic tape will finish in a few minutes is rotated to a position in which the two contacts **188*a* and 188*b* are located, the two contacts 188*a* and 188*b* are simultaneously brought into contact with the end portions 310*a* and 310*b* of the printing circuit 310 thereby closing the switch 188. This causes the base of the PNP transistor $Tr_{21}$ to be grounded through the resistor $R_{20}$, the switch 188, the control switch 66 which is connected to the record position D and the control changeover switch 241, bringing the transistor $Tr_{21}$ into conduction. Accordingly, the alarm generating circuit 230 is actuated to sound an alarm from the speaker 62.**

As the time dial 57 is rotated further, the contact **188*b* only remains in contact with the end portion 310*a* of the printing circuit 310 thereby opening the switch 188. The alarm generating circuit 230 then becomes non-operative and the alarm from the speaker 62** stops.

When the time dial 57 is rotated to a position Q which corresponds to the termination of the tape winding, the switch 188 is closed again and the alarm is sounded.

It is to be noted that the position on the time dial 57 in which the alarm is first sounded is made adjustable by having the end portion **310*a* of the printing circuit 310 inclined relative to the end portion 310*b* and slightly moving the switch 188 for the time dial radially on the time dial 57** to an adjusted position.

Figure 34:
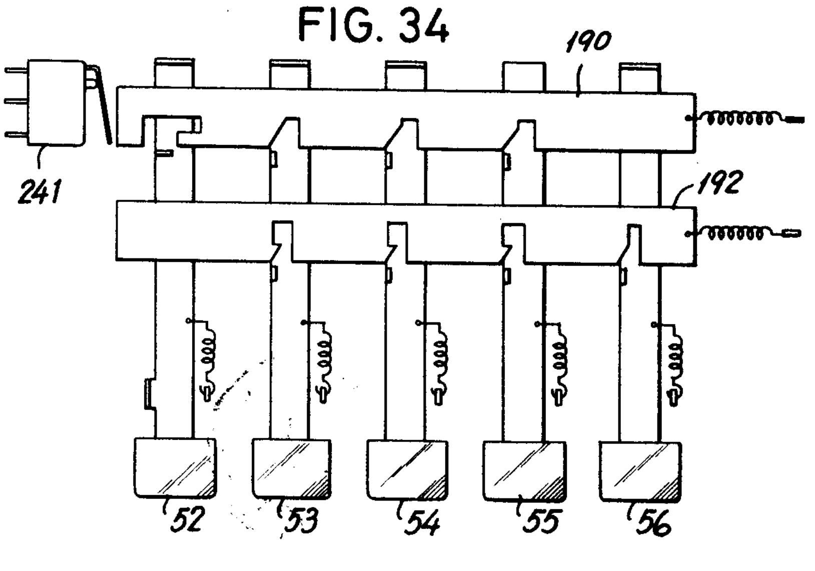
FIG. 34 is a plan view indicating the relationship between control keys of the dictator and a control changeover switch.

The operation of the alarming circuit when the case (3) has occurred will be described with reference to FIG. 34. In FIG. 34, the same component parts as used in the dictator 40 shown in FIG. 4 are designated by the same reference numerals. If either one of the rewinding key 53, the fast-forward key 54 and the telephone-recording key 55 of the dictator 40 shown in FIG. 30 is depressed to have it locked by the locking cam 192 while the four-position control switch 66 is connected to either the record position D, the reproduce position L or the rewind position BS, the dictator 40 is changed to the mode corresponding to the depressed key. The control cam 190 is moved against the force of the spring to the left as viewed in the figure and actuates the control changeover switch 241 to switch the connection of its movable contact from the contact point *h* to the contact point *k*. This causes the emitter of a transistor $Tr_{23}$ to be grounded thereby bringing the transistor $Tr_{23}$ into conduction. Accordingly, the base current flows to a transistor $Tr_{21}$ through the collector-emitter circuit of the transistor $Tr_{23}$ and the control changeover switch 241 which is now connected to the contact point *k*. The transistor $Tr_{21}$ therefore conducts and the alarm generating circuit 230 is actuated to sound the alarm from the speaker 62 for informing the operator of the erroneous operation.

According to the above described alarming device, a single oscillation circuit is activated to sound an alarming sound from a single speaker in each of the cases wherein (1) the dictator is changed to the record mode with the recorded cartridge loaded therein or without any cartridge, (2) the magnetic tape in the cartridge loaded in the dictator has run nearly to the terminal end in a forward direction and (3) one of the operation keys of the dictator is erroneously operated under the condition that the control switch of the manual control switch is connected to a position other than the neutral position.

AUTOMATIC RECALL CIRCUIT

Figures 35, 36, 37:
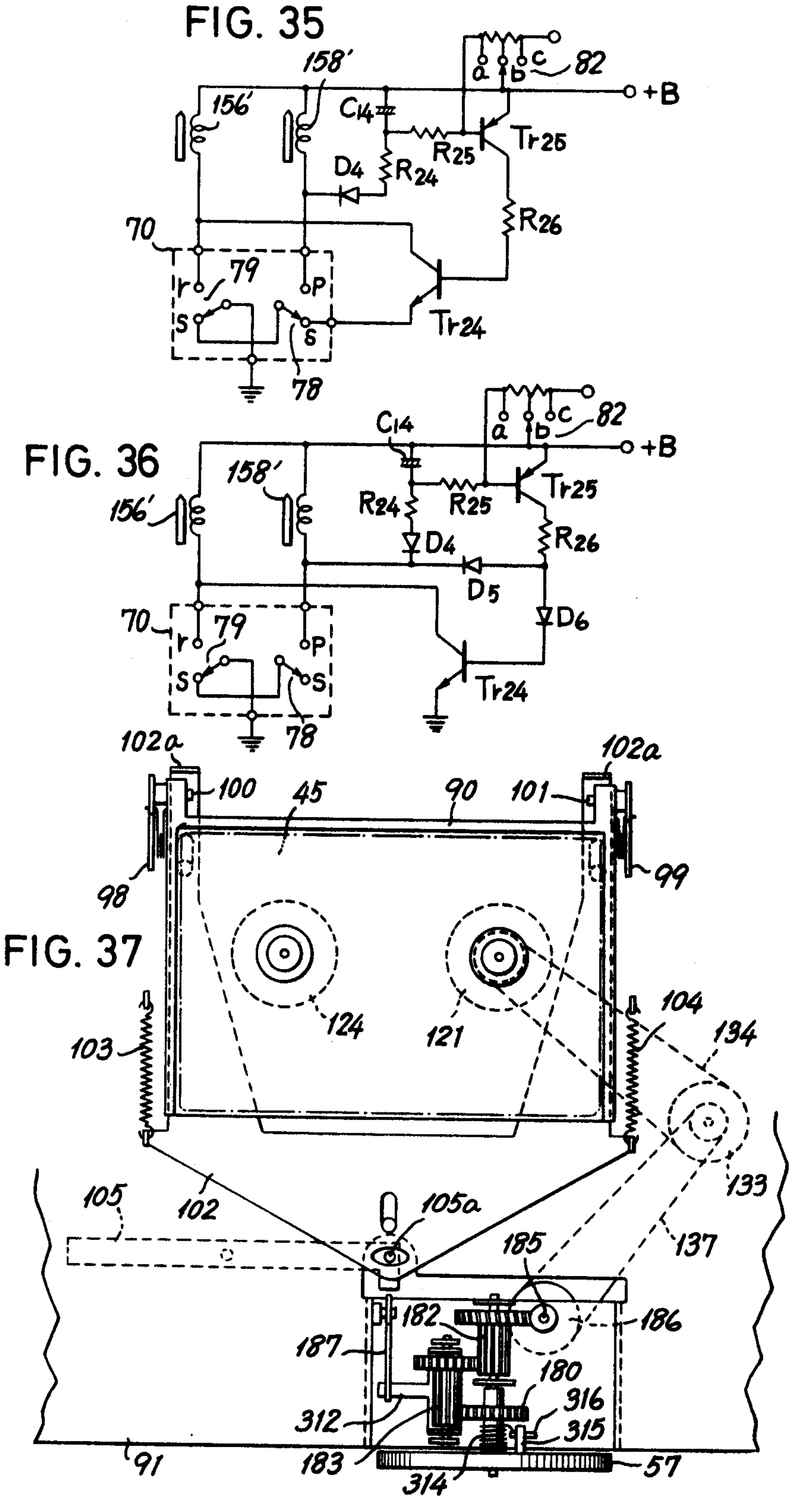
FIGS. 35 and 36 are circuit diagrams respectively showing embodiments of automatic recall circuits employed in the transcriber.
FIG. 37 is a plan view showing one embodiment of a tape indicator mechanism for operating interrelatedly with a cartridge extraction mechanism in the dictator.

When reproduction of the message contents by the transcriber 41 is stopped by operation of the foot control unit 70, the automatic recall circuit is activated to change the mode of the transcriber 41 to the rewind mode thereby rewinding the magnetic tape slightly and thereafter change the mode to the stop mode. Referring to FIG. 35, the operation of the automatic recall circuit will be described. In FIG. 35 the same component parts as those shown in FIG. 10 are designated by the same reference numerals. In the state shown in FIG. 35 wherein the control unit 70 is not in operation and therefore the rewinding switch 79 and the reproducing switch 78 are respectively connected to the contact points *s*, the reproduction solenoid 158' and the rewinding solenoid 156' are in non-operative state. If the movable contact of the reproducing switch 78 is changed over from the contact point *s* to the contact point *p*, the reproducing solenoid 158' is actuated to drive the magnetic tape and charge a capacitor $C_{14}$ through a resistor $R_{24}$, a diode $D_4$ for preventing a reverse current, the reproducing switch 78 and the rewinding switch 79. If the movable contact of the reproducing switch 78 is changed over to the contact point *s* in this condition, the reproducing solenoid 158' becomes non-operative and the running of the magnetic tape in a forward direction is stopped. At this time, a transistor $Tr_{25}$ conducts for a brief period of time because the discharge current of the capacitor $C_{14}$ is supplied to the base of the transistor $Tr_{25}$ through a resistor $R_{25}$. During the conduction of the transistor $Tr_{25}'$ current from a power source +B is supplied to the base of a transistor $Tr_{24}$ through the transistor $Tr_{25}$ and a resistor $R_{26}$. Accordingly, the transistor $Tr_{24}$ is conducting until the capacitor $C_{14}$ ceases to discharge and the rewinding solenoid 156' is actuated during this period of time. The actuating timie of the rewinding solenoid 156' can be suitably adjusted by switching the movable contact of the recall switch 82 to either the contact point *a*, *b* or *c* and thereby selecting a suitable value of resistance.

Thus, when the transcriber 41 is changed from the reproduction modoe to the stop mode by operation of the reproducing switch 78 of the foot control unit 70, the magnetic tape is rewound by a predetermined length after stopping and thereafter stops again. Accordingly, the rewound portion of the magnetic tape is reproduced again in resuming the reproduction from the transcriber 41 by changing it to the reproduction mode. This offers a great convenience in the reproduction of the message contents.

FIG. 36 shows an automatic recall circuit which has three wirings provided from the foot control unit 70. The circuit shown in FIG. 36 comprises, besides the circuit elements employed in the circuit of FIG. 35, a diode $D_5$ for preventing reverse current and a diode $D_6$ for level shifting. If the reproducing switch 78 is changed over to the contact point *p*, the reproducing solenoid 158' is actuated by current from the power source +B to change a capacitor $C_{14}$ and supply current to the base of a transistor $Tr_{25}$. The transistor $Tr_{25}$ therefore becomes conductive. Since the collector of the transistor $Tr_{25}$ is grounded through the diode $D_5'$ the transistor $Tr_{24}$ is not conducting. As the reproducing switch 78 is switched to the contact point *s*, the reproducing solenoid 158' becomes non-operative thereby stopping the running of the magnetic tape. Since the transistor $Tr_{25}$ is maintained in a conductive state for a constant period of time due to the discharge of the capacitor $C_{14}$, current from the power source +B flows to the base of the transistor $Tr_{24}$ through the emitter-collector of the transistor $Tr_{25}$, resistance $R_{26}$ and diode $D_6$. Accordingly, the transistor $Tr_{24}$ which is grounded at its emitter is conducting while the transistor $Tr_{25}$ is conducting after the reproducing switch 78 is changed over to the contact point *s*. The rewind solenoid 156' therefore is actuated for a predetermined period of time and the magnetic tape is rewound by a small length after stopping its running and thereafter stops again.

TAPE INDICATOR MECHANISM INTERLOCKED WITH THE CARTRIDGE EXTRUCTION MECHANISM

The tape indicator mechanism functions to reset, in cooperation with the ejection of the cartridge from the dictator 40, the time dial which is rotated by a predetermined angular range in proportion to the running length of the magnetic tape. Referring to FIGS. 37 through 40, this mechanism will be described in detail. Throughout these figures, the same component parts as those shown in FIGS. 4 through 6 are designated by the same reference characters and descriptions thereof is omitted.

As the take-up reel support 121 rotates in the winding direction, the time dial 57 is rotated in a counterclockwise direction against the force of the spring through the above described belts and reduction gear train, indicating the wound length or time of the magnetic tape in the catridge 45 by means of graduations provided on the front surface thereof. The gear 183 is rotatably carried by a channel-shaped holder 311 which is urged in a clockwise direction as viewed in FIG. 40. The gear 183 positively meshes with the gears 182 and 180.

When the recording on the magnetic tape in the cartridge 45 has been completed, the cartridge ejection key 50 (FIG. 2) is depressed to pivot the lever 105 by a predetermined angle in a clockwise direction as viewed in FIG. 37. This causes the plate 102 to be moved toward the front as viewed in the figure against force of the springs 103 and 104, guided by the upstanding pin 105*a* provided on the lever 105 which extends upwardly through an opening formed in the plate 102 and a slot which cooperates with the pin 105*a*. The bent flanges 102*a* of the plate 102 come into abutting engagement with the end portion of the cartridge platform 90 and thereby cause the cartridge platform 90 and the cartridge 45 to hop up about the pins 100 and 101 by a predetermined angle. In the meanwhile, the other end portion of the lever 105 engages one of the arms of the lever 187 and moves this arm in a pivotal motion in a clockwise direction as viewed in FIG. 39. This in turn causes the other arm of the lever 187 to abut against the arm portion 312 of the holder 311 thereby pivoting it in a counterclockwise direction as viewed in FIG. 40 against force of the spring (not shown). Accordingly, the gear 183 is disengagd from the gears 180 and 182 and the time dial 57 which is integrally formed with the gear 180 is pivoted clockwise by the spring 314 to a position at which "zero" graduation is in register with the reference line (FIG. 2). At this position the projection 315 abuts against a stop 316 thereby restricting the pivotal movement of the time dial 57. By returning the key 50 (FIG. 2) to the original position, the lever 105 also returns to its original position to disengage from the lever 187. This causes the holder 311 to be pivoted by a spring (not shown) thereby bringing the gear 183 into engagement with the gears 182 and 180 again.

Thus, the time dial 57 returns to the "zero" position each time the cartridge ejection key 50 is operated and the time dial 57 starts its rotation from the "zero" graduation in recording or reproducing a different cartridge. Since the operator is not required to reset the time dial 57 each time the cartridge is loaded in the transcriber 41, the above described mechanism is very useful in the dictation recording and reproducing system wherein loading and unloading of cartridges are frequently made.

In the above described embodiment, the indicating medium provided on the transcriber 41 is adapted to move in accordance with the running of the recording medium. It will be apparent to those skilled in the art that the indicating medium may be fixed and a mark device may be moved in accordance with the running of the recording medium.

According to the above described mechanism, marking is made on the indicating medium which moves in accordance with the running of the recording medium when a control signal which is recorded on a track of the recording medium different from one for the dictated message signal is reproduced from the recording medium by the transcriber. Hence, the marking position on the indicating medium set in the transcriber accurately corresponds to the message signal recording position and a position of each instruction message on the recording medium loaded in the transcriber. It should be further noted that according to the invention the recording medium only may be transferred from the dictator to the transcriber. This is advantageous because loss of the recording medium and disagreement between the contents of the recording medium and those of the indicating medium can be prevented. Furthermore, no special time is required for the marking on the indicating medium because it is made concurrently with rewinding of the recorded recording medium for subsequent reproduction.

Further, this invention is not limited to these embodiments but various and modifications may be made without departing from the scope and spirit of the invention.

What we claim is:

1. A dictator-transcriber indexing system comprising a dictator and a transcriber, said dictator comprising:

first means for moving a recording medium in a first direction at a predetermined speed;

a recording and/or reproducing head;

first means for recording dictation message signals through said recording and/or reproducing head on a first track of the recording medium moving at said predetermined speed;

means for producing a first control signal which is continuously generated during the period in which said first recording means is in its recording mode of operation;

means for producing a second control signals at the instants of starting and/or completion of the recording of separate messages in said recording mode of said first recording means;

means for producing a third control signal for indicating instruction marks;

second means for recording said first, second and third control signals through said recording and/or reproducing head on a second track of the recording medium moving at said predetermined speed;

said transcriber comprising:

a reproducing head;

said first means for moving said recording medium in said first direction at said predetermined speed;

first reproducing means for reproducing said dictation message signals through said reproducing head from the recording medium moving at said predetermined speed in said first direction;

second means for moving said recording medium in a second direction opposite to said first direction at a higher speed than said predetermined speed;

said reproducing means for reproducing said recorded control signals through said reproducing head from said recording medium moving at said higher speed in said second direction, including means for contacting said reproducing head with the recording medium with a pressure lighter than the pressure with which said reproducing head contacts said recording medium during the operation of said first reproducing means;

means for individually separating said first, second and third control signals from the output signal of said second reproducing means;

an indication medium;

means for moving said indication medium in relation to the travel of said recording medium;

means responsive to the separated second control signal for imprinting a first mark on a first track of the moving indication medium;

means responsive to the separated third control signal for imprinting a second mark on a second track of the moving indication medium.

2. A dictator-transcriber indexing system as set forth in claim 1 wherein said first control signal has a specific frequency; said second control signal having a frequency which is a multiple of said specific frequency; said third control signal having a frequency which is another multiple of said specific frequency; and wherein said separating means comprises means for respectively filtering said first control signal, said second control signal and said third control signal from the output signal of said second reproducing means.

3. A dictator-transcriber indexing system as set forth in claim 1 wherein said first control signal has a specific frequency; said second control having a frequency which is a multiple of said specific frequency; said third control signal having said specific frequency and having a higher level than the level of said first control signal; and wherein said separating means comprises low-pass filter means for filtering said first and third control signals from the output signal of said second reproducing means, level detector means for detecting the level of said third control signal and separating said third control signal from the output signal of said low-pass filter means, and high-pass filter means for filtering said second control signal from the output signal of said second reproducing means.

4. A dictator-transcriber indexing system as set forth in claim 1 wherein said dictator further comprises:

third means for moving the recording medium in said first direction at said higher speed;

third reproducing means for reproducing the recorded control signals through said recording and/reproducing head from the recording medium moving at said higher speed in said first direction, including means for contacting said recording and/or reproducing head with the recording medium with a pressure lighter than the pressure with which said recording and/or reproducing head contacts said recording medium during the operation of said first recording means; and means responsive to the absence of said first control signal in the reproduced control signals for stopping the travel of the recording medium.

5. A dictator-transcriber indexing system as set forth in claim 1 wherein said dictator further comprises:

said second means for moving the recording medium in said second direction opposite to said first direction at a higher speed than said predetermined speed;

fourth reproducing means for reproducing the recorded control signals through said recording and/or reproducing head from the recording medium moving at said higher speed in said second direction, including means for contacting said recording and/or reproducing head with the recording medium with a pressure lighter than the pressure with which said recording and/or reproducing head contacts said recording medium during the operation of said first recording means; and means responsive to said second control signal in the reproduced control signals for stopping the travel of the recording medium.

6. A dictator-transcriber indexing system as set forth in claim 1 wherein said dictator and transcriber each further comprises said second means for moving the recording medium in said second direction opposite to said first direction at a higher speed than said predetermined speed; and said dictator and said transcriber each further comprise:

third means for moving the recording medium in said direction at said higher speed;

an erasing head; and means for erasing the recorded dictation message signals and the recorded control signals on the recording medium moving in said first direction or said second direction at said higher speed, including means for contacting said erasing head with said lighter pressure.

* * * * *